United States Patent [19]

Bingman

[11] Patent Number: 5,007,786
[45] Date of Patent: Apr. 16, 1991

[54] REFUSE COLLECTION SYSTEM, REFUSE COLLECTION TRUCK AND LOADER ASSEMBLY THEREFOR

[75] Inventor: John W. Bingman, Mesa, Ariz.

[73] Assignee: Sunbelt Automated Systems, Inc., Phoenix, Ariz.

[21] Appl. No.: 281,558

[22] Filed: Dec. 8, 1988

[51] Int. Cl.$^5$ ................................................ B65F 3/02
[52] U.S. Cl. .................... 414/409; 414/486; 414/555; 414/648
[58] Field of Search .............. 414/404, 406, 408, 409, 414/410, 648, 658, 486, 488, 555; 187/9 R, 17, 20

[56] References Cited

U.S. PATENT DOCUMENTS

| 2,808,947 | 10/1957 | Shippy | 414/409 |
|---|---|---|---|
| 3,844,434 | 10/1974 | Blakeley et al. | 414/409 |
| 3,910,434 | 10/1975 | Ebeling et al. | 414/408 |
| 4,057,156 | 11/1977 | Thompson et al. | 414/409 X |
| 4,219,298 | 8/1980 | Stragier et al. | 414/409 |
| 4,313,707 | 2/1982 | Bingman et al. | 414/409 |
| 4,597,710 | 7/1986 | Kovats | 414/409 |
| 4,669,940 | 6/1987 | Englehardt et al. | 414/409 X |
| 4,708,570 | 11/1987 | Smith et al. | 414/408 |

Primary Examiner—Robert J. Spar
Assistant Examiner—John Vanden Bosche
Attorney, Agent, or Firm—Gregory J. Nelson

[57] ABSTRACT

An improved loader apparatus for a refuse collection truck or vehicle which includes a vertical rail assembly, a carriage apparatus mounted for vertical up and down movement along the rail assembly, a single length of drive chain for lifting and lowering the carriage apparatus between a home or down position and a dump or up position, a hydraulic motor system for driving the drive chain such that the refuse container-engaging apparatus carried by the carriage assembly can be position laterally outwardly therefrom for operatively engaging a refuse container to be emptied. The system includes a feedback system for controlling the speed, acceleration and deacceleration of the pick-up, transporting, emptying, lowering, and releasing cycle for minimizing cycle time while simultaneously maximizing the dumping efficiency of the system. In the preferred embodiment of the present invention an improved refuse collection vehicle having a plurality of individual different and distinct refuse storage bins each designated for receiving one and only one type of refuse therein such as glass, aluminum cans, plastics, other metals, garbage, trash, paper, and the like, or one and only one predetermined mix of such types. A plurality of refuse containers are located at each pick-up site, and each includes indicia for identifying the particular type or type mix of refuse contained therein for bin-selection purposes. The improved refuse collection truck of the present invention includes an improved loader assembly which has a longitudinal positioning system for selectively positioning the rail assembly and carriage assembly, including the operatively engaged refuse container to be emptied, longitudinally along the side of the vehicle to a position adjacent the particular bin designated for receiving the particular type of contents identified as being within the selected refuse container, and an automated system for longitudinally positioning, lifting, emptying, transporting, lowering, restoring and releasing the emptied refuse container to its orignal or another suitable position at the pick-up site.

13 Claims, 9 Drawing Sheets

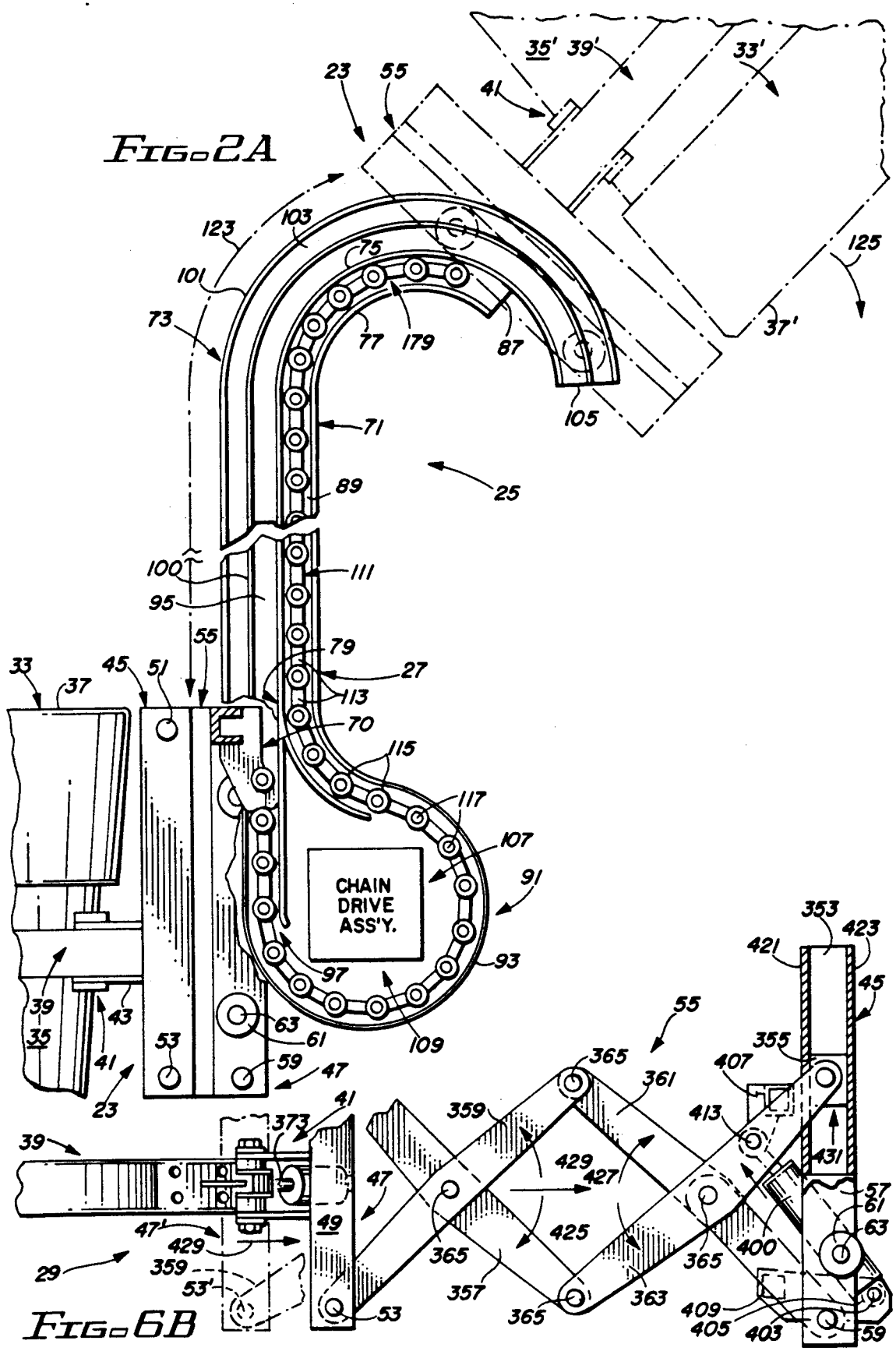

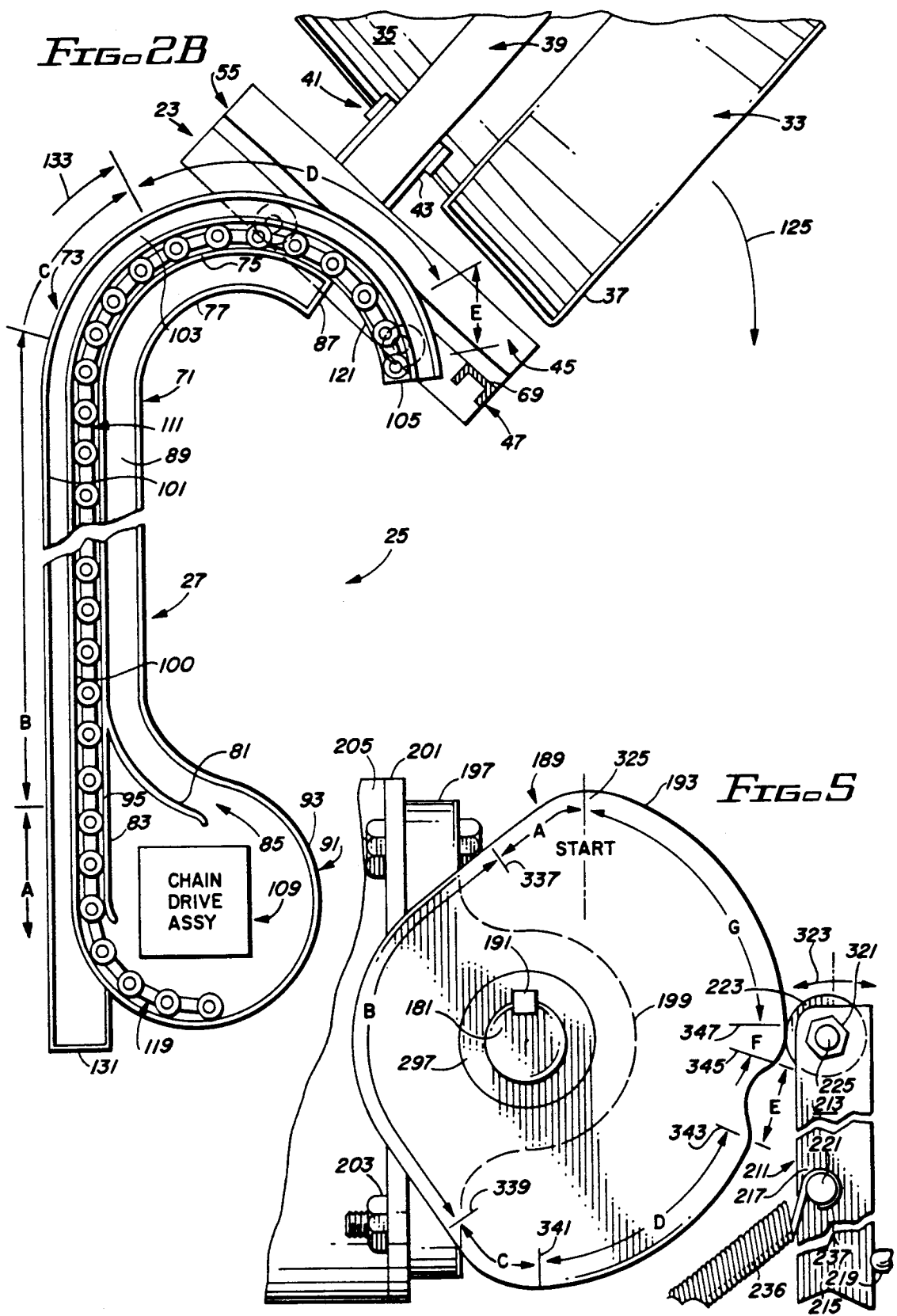

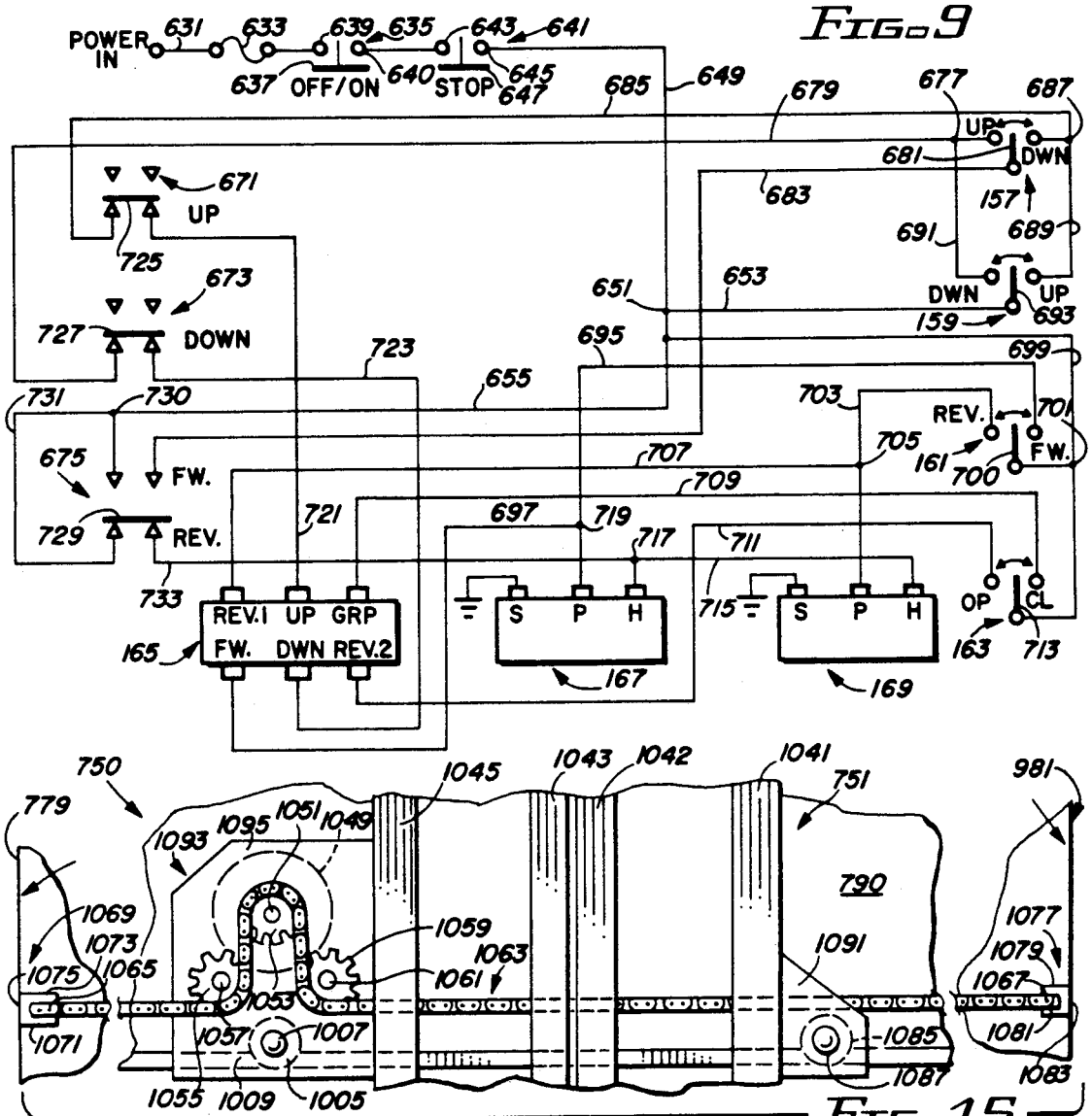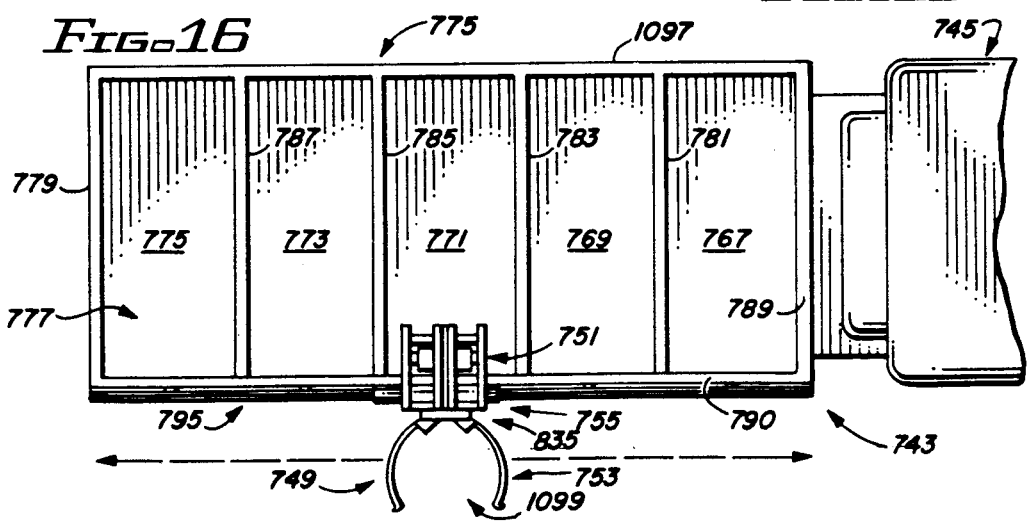

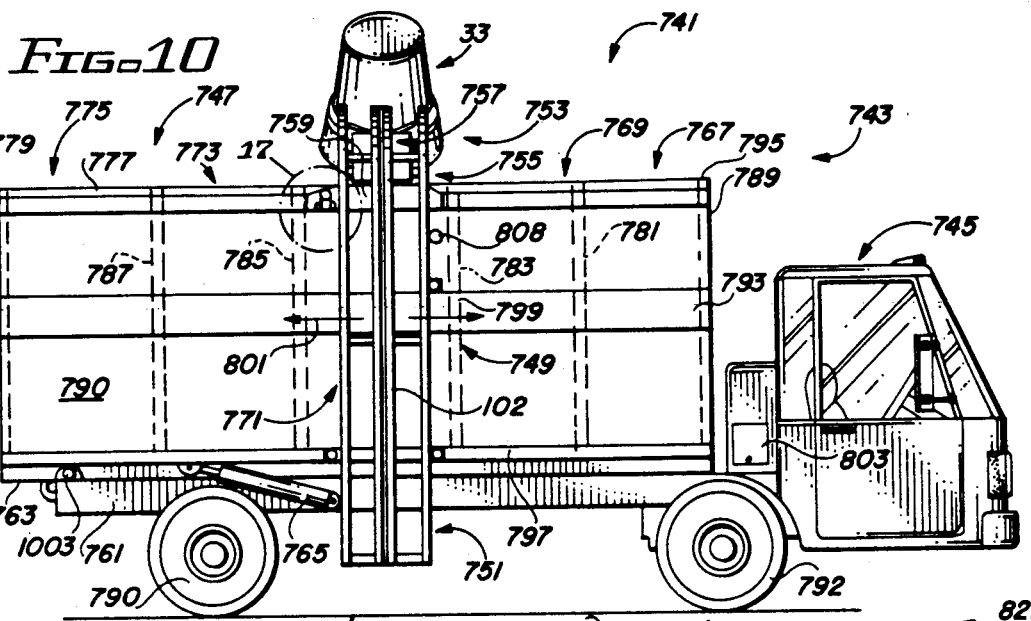

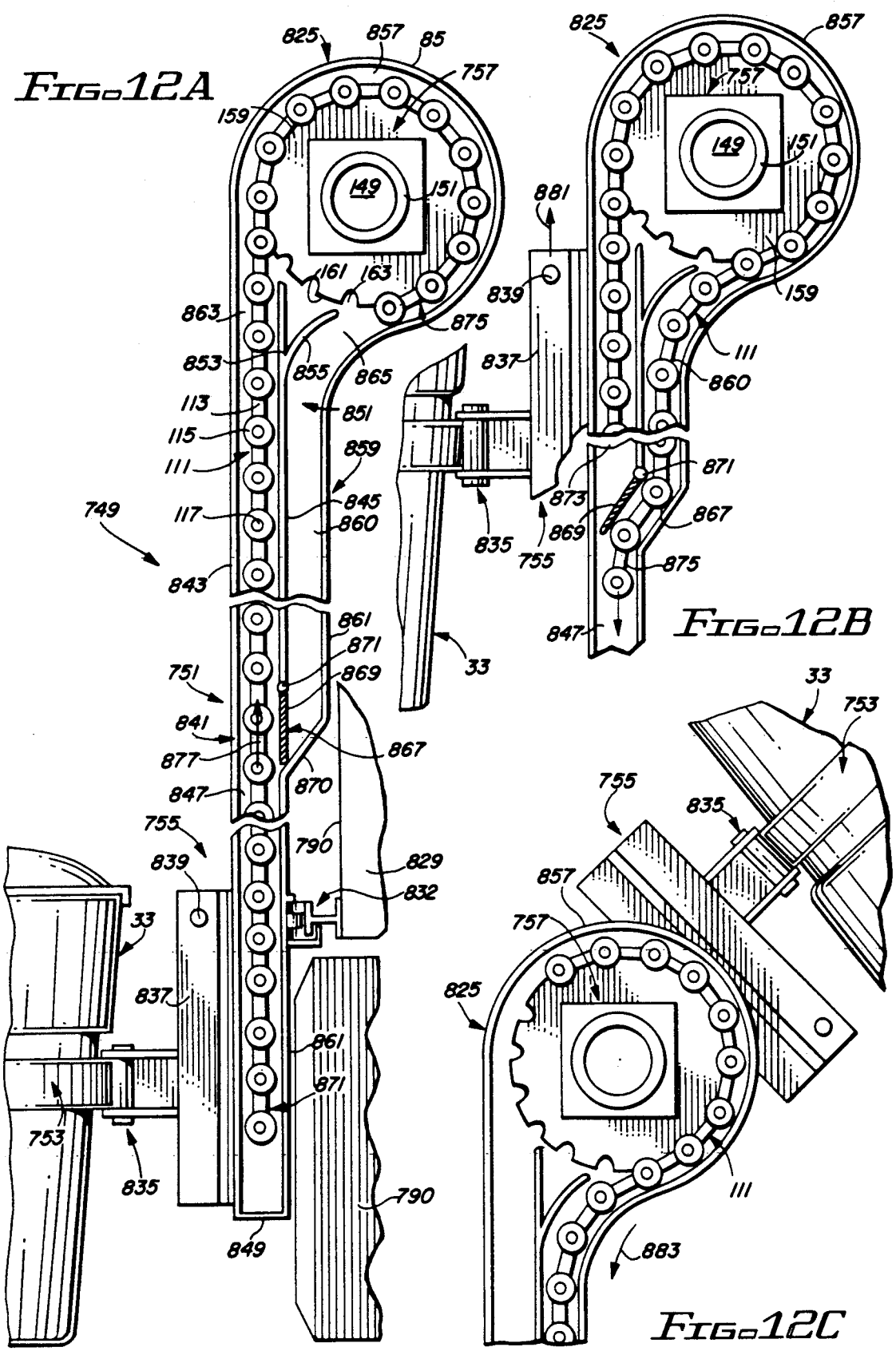

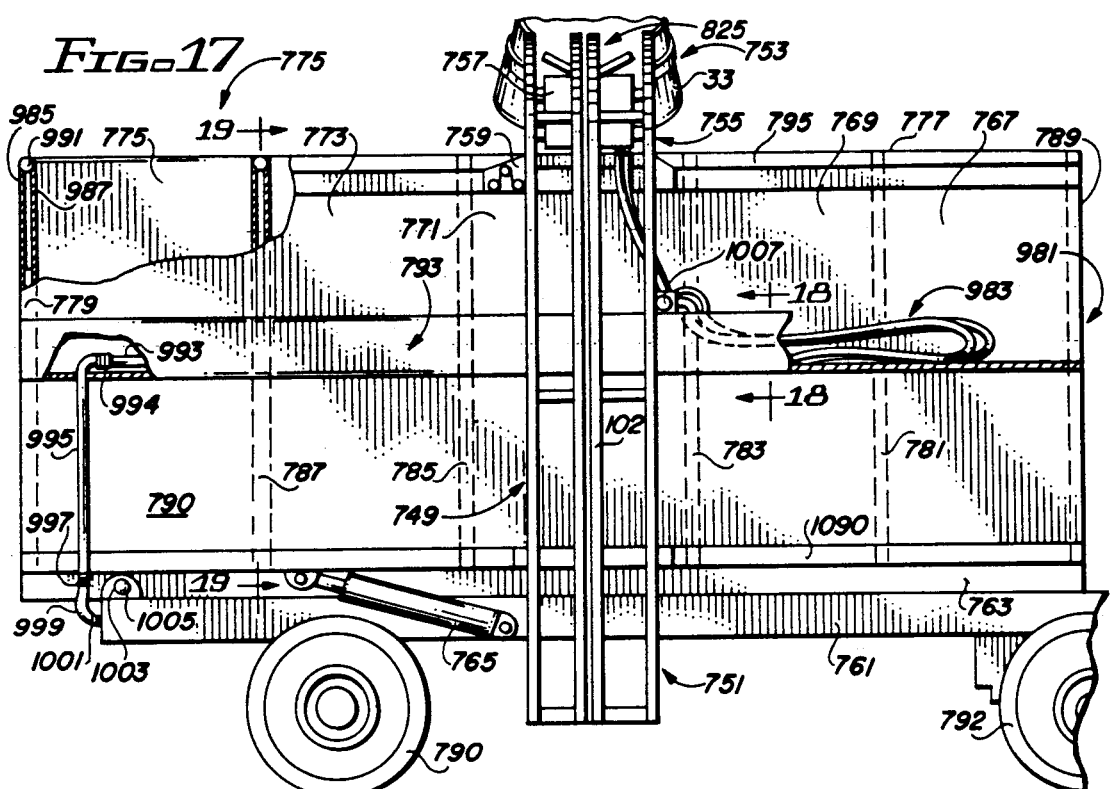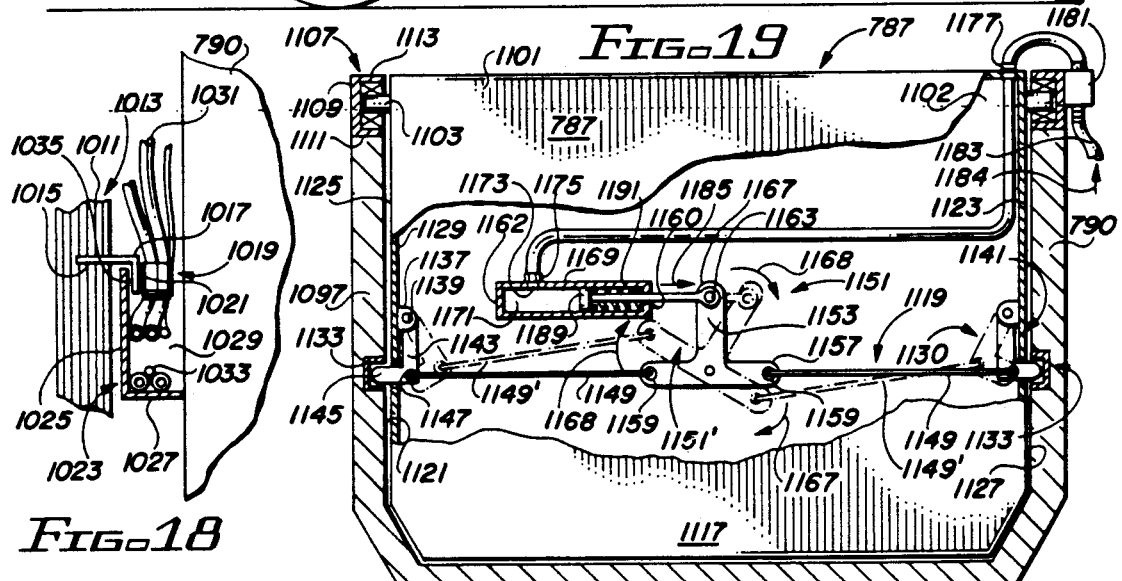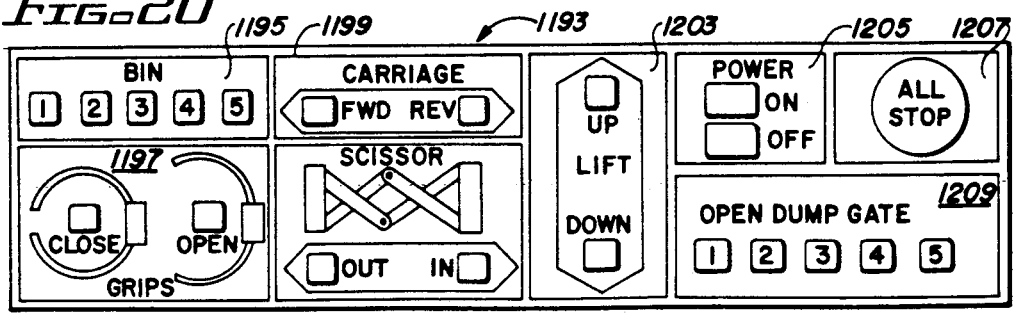

REFUSE COLLECTION SYSTEM, REFUSE COLLECTION TRUCK AND LOADER ASSEMBLY THEREFOR

BACKGROUND OF THE INVENTION

1. Field Of The Invention

The present invention relates generally to an improved refuse collection system, and more particularly, to an improved refuse container loading assembly and a multi-bin refuse truck provided therewith.

2. Description Of The Prior Art

The prior art is illustrated generally by the following three U.S. Patents. U.S. Pat. No. 4,313,707 issued on Feb. 2, 1982 to John W. Bingham, the present inventor, for a "Side-Loading Apparatus For A Trash Collection System". This patent discloses a trash collection apparatus for mounting a in a fixed position on the side of the collection refuse truck. A frame member is extendable secured to the vehicle for movement away from and toward the truck body or bed of the vehicle. A pair of vertically extending guide rails are secured to the frame. Each guide rail incorporates a top section that is pivoted about a horizontal axis. A carriage is mounted for movement along the guide rails and incorporates a pair of gripping arms which are pivoted for movement in a horizontal plane to grasp a trash container, and the gripping arms are also pivoted for movement in vertical planes for moving to a stowage position. A hydraulic piston and cylinder are utilized to raise the carriage along the guide rails to position the carriage on the top section of the rails. Hydraulic actuators are provided for tilting the top sections of the rails when the carriage is positioned on the top sections to tip the carriage, gripping arms, and the trash container over the side of the truck for emptying the contents of the trash container into the bed or a loading station of the trash collection vehicle.

U.S. Pat. No. 4,057,156 issued on Nov. 8, 1977 to Vern C. Thompson and John A. Riggle for a "Lifting Arm Apparatus". The patent discloses a side-loading apparatus for facilitating the use of the system along relatively narrow aisles or alleys. It requires no manipulation of the container by the human operator, nor any preliminary dumping of material into a container permanently carried by the vehicle. Inversion of the container does not begin until it has been lifted beside the vehicle to an appropriate height adjacent an opening in the bed of the vehicle, thus avoiding spillage. The container is lifted from and replaced at a location automatically and gently, using pneumatic engagement which involves minimum damage to refuse containers. All other operations are hydraulic, and are under the operator's regular and emergency control at all times.

U.S. Pat. No. 4,597,710 issued on July 1, 1986 to Lawrence H. G. Kovats for a "Trash Collection Vehicle Side-Loading Apparatus". The invention of this patent is primarily directed to an improved rail construction and also to an improved means for orienting the carriage during its return to ground. One aspect of the invention is concerned with one of the guide rails on one side of the frame being straight whereas the other guide rail on the same side of the track incorporates the curved and horizontal top section. A carriage is mounted on rollers with an upper roller and a lower roller being provided on each side of the carriage. The lower roller always remains in the straight rail whereas the upper roller rides in the rail having the curved and horizontal sections at its upper end. The carriage is made to ascend and descend along the guide rails by means of a hydraulic piston-driven chain arrangement and with means to control carriage speed at various stages of ascent and descent. The refuse container is held on the carriage by means of a pair of jaws which are hydraulic actuated. A spring-loaded stop and overtravel arrangement is provided at the top of the vertical rails to assure the correct orientation of the carriage on the rails when returned to the ground position.

While these patents did represent a step forward in the prior art, they did not solve many of the problems inherent therein, and they introduced still additional problems not heretofore encountered. One major problem still existing in the prior art is that the time required to reach out and pick-up a refuse container to be emptied, retract the container toward the side of the truck, raise the container, dump the contents thereof into the refuse collection vehicle and then lower and return the emptied refuse container to its position a predetermined distance away from the side of the truck, takes far to long and adds greatly to the cost of refuse pick-up and removal.

Furthermore, the emptying efficiency of the prior art systems is relatively poor, and supposedly emptied refuse containers often retain various types and amounts of refuse therein after they have been replaced and released at the particular pick-up site. Still further, the entire process is not automated and certainly not optimized by feedback means which controls the speed, acceleration and deceleration of the cycle. Still further, most of the systems illustrated above involve many mechanical parts and are not relatively simple and maintenance free thereby causing frequent breakdown of the system and further delays in the refuse collection routine.

Furthermore, none of the prior art shows the use of a multi-bin refuse collection vehicle wherein each of the bins is adapted or designated to receive only one particular type of refuse such as glass, paper, aluminum cans, plastics, other metals, trash, garbage, and the like, or only one predetermined mix of such types. In the present system, the individual refuse containers to be picked-up and emptied include indicia means on each of the refuse containers to be emptied, and the indicia means is either visually identifiable by the operator or machine-readable by apparatus in the system for bin selection purposes. The economic value of being able to quickly and easily separate the refuse into different types is quite significant and could possibly pay for the cost of garbage, trash, or refuse removal in and of itself. Furthermore, in this day of environmental awareness, as refuse sites, incinerators, and the like are coming under fire for environmental defficiencies, the environmental impact of such a system is very, very significant. None of the vehicles of the prior art teach a vertical rail system which can be positionably horizontally or longitudinally along the side of the truck for bin selection purposes and/or for pick-up and releasing the containers at a particular position adjacent the side of the truck.

The present invention provides a solution to many of the previously unsolved problems of the prior art as well as providing a unique, totally new multi-bin refuse truck and refuse collection loading system therefore which has both great environmental and significant economic value.

SUMMARY OF THE INVENTION

It is an object of the present invention to provide an improved refuse collection system.

It is another object of this invention to provide an improved side-loading refuse container pick-up and emptying apparatus for a refuse collection truck.

It is a further object of this invention to provide an improved refuse collection vehicle.

It is still another object of the present invention to provide a refuse collection vehicle having an improved loader assembly.

It is yet another object of this invention to provide a multi-bin refuse collection truck having an improved loader system.

It is still a further object of this invention to provide a loader assembly for minimizing the time required to pick-up a refuse container to be emptied, raise the container and dump its contents into the refuse collection vehicle, and then lower the emptied refuse container and reposition the empty container at its previous or any other suitable release location.

It is yet a further object of the present invention to provide an improved loader assembly having feedback control for minimizing the loading cycle time of the system.

It is one object of this invention to provide an apparatus for maximizing the dumping efficiency of an improved loader system.

It is another object of this invention to provide an improved loader assembly for a refuse collection vehicle wherein the refuse container emptying cycle time is minimized while the refuse container emptying efficiency is maximized.

It is still another object of this invention to provide an improved refuse collection vehicle having a plurality of refuse storage bins, each of which is designated for receiving only one particular type of refuse such as glass, aluminum cans, paper, other metals, trash, garbage, plastics, and the like or only one predetermined mix of such types.

It is yet another object of the present invention to provide an improved side-loading refuse container pick-up and emptying system for a refuse collection vehicle wherein at least a portion of the pick-up, emptying and repositioning operation is substantially automated.

It is a further object of this invention to provide a side-loading refuse container pick-up and emptying system including a cam means for controlling the speed, acceleration and deceleration of the system operation.

It is still a further object of this invention to provide an elongated length of drive chain having unconnected opposite ends for lifting and lowering the refuse container to be emptied.

It is yet a further object of the present invention to provide an improved refuse collection system including a hydraulic motor system operatively mounted to the lower end or in the bight of the arcuately, downwardly-curved, upper end portion of the vertical rail assembly.

It is another object of the present invention to provide an improved loading system for a multi-bin refuse collection vehicle wherein the loading system includes a horizontal rail assembly extending substantially the entire length of the side of the vehicle bed, and a drive apparatus for selectively positioning the loading system adjacent the particular designated bin into which the particular contents of the transported refuse container are to be emptied or dumped.

It is still another object of this invention to provide an improved refuse collection system wherein a plurality of refuse containers located at any one pick-up site along the refuse collection vehicle's designated route are each designated for containing one and only one particular type of refuse such as glass, plastics, aluminum cans, paper, other metals, trash, garbage, and the like, or any one predetermined mix of such types, and wherein each of the refuse containers includes indicia means for identifying the particular contents thereof for pick-up by a multi-bin refuse collection vehicle.

It is yet another object of the present invention to provide, in the above system, a visually-identifiable indicia for recognition by the operator of the system for bin-selection purposes.

It is yet a further object of this invention to provide, in the above system, a machine-readable indicia on each of said refuse containers and an indicia-reading apparatus within the loader assembly for automatically recognizing the indicia and controlling the longitudinal positioning of the loader assembly along the side of the refuse collection vehicle for positioning same adjacent a particular bin designated to receive the identified contents of the picked-up and transported refuse container.

The present invention relates to an improved loader assembly for refuse collection vehicles. The refuse vehicle or truck proceeds along the designated route until it comes to a pick-up station, location, or stop where at least one filled or at least partially filled refuse container is waiting to be emptied. The truck pulls along side the location of one of the refuse containers and stops when the refuse container to be emptied is adjacent to but spaced a predetermined distance away from the loader assembly which is mounted on one side of the bed of the vehicle or the frame thereof. The loader assembly includes a carriage assembly which rides vertically up and down a set of wheel guides or tracks. The carriage assembly has a vertical up or "dump" position and a vertical down or "home" position. In the home position, the carriage assembly is disposed adjacent the side of the truck, but it can be laterally or horizontally extended a predetermined distance to retainably receive or engage a selected refuse container for emptying purposes at an extended "pick-up" position. The retainably received refuse container is then retracted back to the home position and is immediately moved upward along the wheel guides until the contents of the refuse container are emptied or dumped into the bed or receiving station of the refuse collection vehicle. The carriage assembly, now caring the emptied refuse container, runs back down the guide track to the home position and re-extends the emptied refuse container back to its original space for releasing same. The truck then repositions itself forward or backward until it is abeam the next refuse container to be emptied at that stop, and the cycle repeats itself until all refuse containers at that stop or location have been picked-up, emptied and returned. It then proceeds to the next designated stop along its route and repeats the above until it is full or until it has finished its route. The refuse collection vehicle then goes to a designated dump site or depot and empties or dumps the contents of the truck to begin anew. Preferably, the cycle of operation is at least partially automated, if not totally so, and includes feedback apparatus for controlling the speed, acceleration, and deceleration of the cycle for minimizing the time required for pick-up, transport, dumping and returning the refuse container, while simultaneously maximizing the refuse container dumping or emptying efficiency.

In the preferred embodiment, a single elongated link of drive chain having its opposite ends unconnected is used to push or pull the carriage apparatus up and down the guide track. A scissors assembly may be used for extending and retracting the pick-up portion of the carriage assembly between the home position and the pick-up position. The entire system is hydraulically operated, relatively mechanically simple, and substantially maintenance free.

In a second embodiment of the present invention, a refuse collection truck or vehicle is provided with a plurality of different and distinct individual refuse storage bins, each of which is designated to receive only one type of refuse such as glass, aluminum cans, paper, other metals, plastics, trash, garbage, and the like or a predetermined mix of such types. A plurality of refuse containers are located at each stop along the route, and each of the refuse containers includes indicia means thereon for identifying the particular type or type mix of refuse contained therein. In this embodiment, the refuse truck can park adjacent a first selected refuse container to be picked up and emptied or simply parked next to the refuse containers in general and the longitudinal positioning system can be used to align the refuse container to be picked up thereby. As a selected refuse container is picked up, its indicia is read, either by machine-readable apparatus or visually by the operator himself, and bin selection is made. The longitudinal positioning of the selected refuse container along the side of the refuse truck occurs as a result of the identification and is generally automatic and simultaneous with the lifting of the selected refuse container for dumping purposes. The refuse truck can either be repositioned for subsequent pick-up cycles at that location or the longitudinal positioning system can be used for positioning the carriage apparatus adjacent each new refuse container as it is to be picked up and emptied.

In the preferred embodiment of the above, a feedback system is used for controlling the speed, acceleration and deceleration of the pick-up, transport, emptying, and replacing cycle to maximize the refuse container dumping or emptying efficiency while simultaneously minimizing the cycle time to speed up the refuse collection process. The present invention relates not only to the improved refuse collection system and the improved refuse collection vehicles, but also to the particular apparatus and the method of operation of the systems.

These and other objects and advantages of the present invention will be more fully understood after reading the detailed description of the preferred embodiments of the present invention, the Claims, and the drawings which are briefly described hereinbelow.

IN THE DRAWINGS

FIG. 2A is a sectional side view of the loading apparatus of FIG. 1 in the down or "home" position;

FIG. 2B is a sectional side view illustrating the loader apparatus of FIGS. 1 and 2A in the "dump" position;

FIG. 5 is a side view of the cam system of the present invention;

FIG. 6B is a top view of the carriage assembly of FIG. 6A including the scissors assembly thereof;

FIG. 9 is an electrical schematic diagram of the system of the present invention;

FIG. 10 is a side view of an alternate embodiment of an improved refuse collection vehicle having an improved loader assembly mounted on one side thereof;

FIG. 11 is a partial side view of the loader assembly of FIG. 10 of the present invention;

FIG. 12A is a sectional side view of the loader assembly of FIGS. 10 and 11 illustrating the drive chain and guide tracks therefore in the "home" position;

FIG. 12B is a partial side view of the apparatus of FIG. 12A wherein the drive chain and carriage assembly are lifted to an intermediate position;

FIG. 12C is a partial side view of the vertical upper end portion of the loader assembly of FIGS. 12A and 12B wherein the drive chain and carriage assembly is in the vertical upward "dump" position;

FIG. 13 is a sectional side view of a portion of the longitudinal positioning rail assembly of FIGS. 12A, 12B, and 12C and showing the wheels or rollers of the longitudinal positioning system disposed therein;

FIG. 14 is a sectional top view of a portion of the vertical positioning rail apparatus of FIGS. 12A, 12B, and 12C wherein the carriage assembly wheels are disposed therein;

FIG. 15 is a partial sectional side view illustrating the longitudinal positioning drive system of the loading apparatus of FIG. 10;

FIG. 16 is a top plan view showing the plurality of individual different and distinct bins of the bed of the improved refuse collection truck or vehicle of FIG. 10;

FIG. 17 is a side view of the bed portion of the improved refuse collection truck or vehicle of FIG. 10 showing additional details of the improved hydraulic motor assembly and longitudinal rail system thereof;

FIG. 18 is a partial sectional end view of the system of FIG. 17 taken along view lines 18—18 thereof;

FIG. 19 is a sectional end view of one of the dump gates or dividers of the plurality of bins of the improved refuse collection vehicle of FIG. 10 taken along view lines 19—19 of FIG. 17; and FIG. 20 is a plan view of an instrument control panel useable with the system of the present invention.

DETAILED DESCRIPTION OF THE INVENTION

Figure 1:
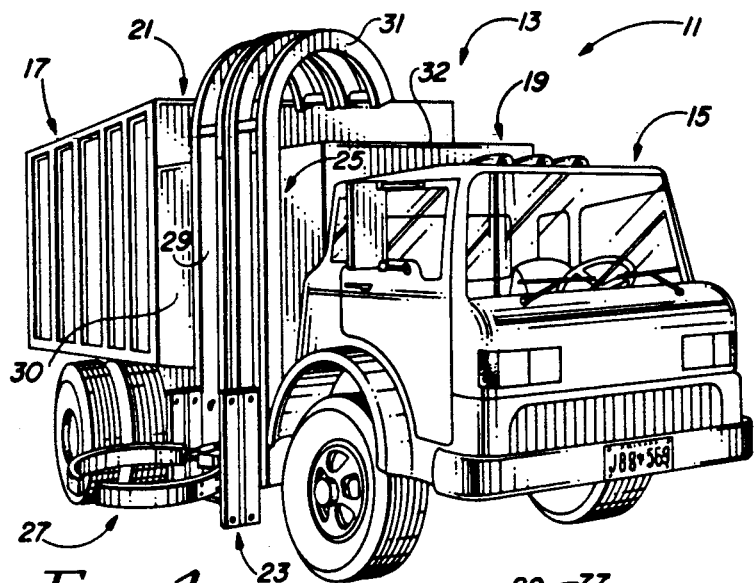
FIG. 1 is a perspective view of a conventional refuse truck provided with the refuse container loading system of the present invention.

FIG. 1 illustrates an improved refuse truck equipped with the loader assembly of the present invention and is designated generally by reference numeral 11. The improved truck with loader combination 11 includes a conventional refuse truck 13 having a cab 15 for housing a driver or operator and possibly a helper or assistant. The refuse truck 13 also includes a refuse storage bed 17 toward the rear of the truck and an open-top loading station 19 adjacent the cab 15. As conventionally known, once the refuse is dumped into the open top loading station 19, it can be compresses rearwardly into the refuse storing bed 17 to make room for further refuse to be dumped into the open top loading station 19.

The refuse truck 13 of FIG. 1 is equipped with a loader assembly 21 of the present invention mounted on one side 30 of the bed 17 adjacent the open top loading station 19. The loader assembly 21 includes a carriage assembly 23, a guide rail assembly 25, and a can-gripping assembly 27. The vertical lower end portion of the rail guide assembly 25 is designated by reference numeral 29 and the generally semicircular or downturned top end portion of the guide rail assembly 25 is designated by reference numeral 31.

In operation, the refuse truck 13, which is also referred to as a garbage truck, trash truck, or the like, drives along its route until it reaches a pick-up station having one or more refuse containers, cans or barrels (not shown, but well-known in the art) waiting to be picked up and dumped. The truck 13 parks adjacent the refuse containers to be picked up, and the following are actuated from a control box either within the cab 15 or mounted adjacent thereto external to the cab 15, as desired. The gripping arm assembly 27 first opens so it is able to receive the refuse barrel therein. The carriage assembly 23 then extends laterally from a "home position" adjacent the side 30 of the truck 13 via a scissors assembly portion, to be described hereinafter, until the refuse barrel is within the opened arms of the gripping assembly 27 at the "pick-up" position displaced a distance from the side of the truck 13. The arms are then caused to close tightly about the outer surface of the refuse barrel, and the carriage assembly 23 retracts the gripped barrel back to the home position while still at its normally down position. The carriage assembly 23 is then moved upward along the vertical rail assembly 25 and over the arcuate top rails 31 to the up position to dump the contents of the refuse barrel into the open top 32 of the open top loading station 19. The reverse cycle then begins, and the carriage assembly 23 carries the emptied refuse container, can, or barrel back to the down position. The carriage assembly 23 then expands laterally outward from its home position, via the scissors assembly, and positions the emptied refuse container at its original spot or at any convenient location thereby. The gripping arm assembly 27 then opens to release the emptied refuse container and then retracts, via the carriage assembly 23, to the home position. The truck 13 is then ready to pick-up other refuse containers at that location by pulling forward or rearward until proceed along its route to pick-up the next designated refuse barrel for collection.

FIG. 2A illustrates the loader assembly 21 of FIG. 1 in greater detail. FIG. 2A shows a refuse can, barrel or container 33, also referred to as a garbage can, trash can, or the like having exterior sides or surfaces 35 and an open or openable can top 37. While the refuse containers are generally cylindrical, the use of the present invention with containers having a generally rectangular cross-section are also contemplated. Similarly containers with pick-up brackets or the like can also be used. The shape of the gripping arms would simply be changed to suite the cross-section and/or brackets, as would be obvious to one of ordinary skill in this art. The can-gripping assembly 27 includes a gripping arm assembly 39 and an arm-operating assembly 41, as hereinafter described. A support bracket 43 positions the arm-operating assembly 41 and attaches it to the horizontally movable carriage support assembly 45 of the carriage assembly 23. The horizontally movable carriage support assembly 45 is attached to the horizontally fixed carriage support assembly 47 by a scissors assembly 55, shown in FIG. 6B in the extended or "pick-up" position. The horizontally movable carriage support assembly 45 includes a vertical carriage support 49 having an upper pivot pin 51 and a lower pivot pin 53. The horizontally fixed carriage support assembly 47 includes a vertical carriage support member 57 having a lower pivot pin 59, a lower carriage wheel 61, a carriage wheel axle or pin 63, an upper carriage wheel 65, an upper carriage wheel axle or pin 67 and a horizontal cross-carriage support member 69. The cross member 79 supports a chain dog assembly 70, as hereinafter described.

The guide rail assembly 25 includes a single, generally U-shaped chain guide rail assembly having a first interior chain guide leg 100, a second exterior chain guide leg 77, and an intermediate or channel-separating guide leg 75. The interior chain guide leg 71 includes an inner chain guide track side 75 and an outer or exterior chain guide track side 77. The track side rail 75 is terminated by an inverted Y-shaped tracked divider 79 having a first arm 81 continuing the interior track side 75 opposite the exterior track side 77, and a second arm or leg 83 continuing a predetermined distance as a second track side 75. The lower open end 85 of the interior chain guide track 75 opens where the arm 81 terminates while the opposite rail 77 continues as a single exterior guide rail 93 forming the outer boundary of the generally circular rail guide portion 91. The opposite upper end of the chain guide rail assembly 71 includes an upper open end 87. The chain guide rail assembly 71, bounded by sides 75 and 77 for forming a chain guide channel, track, or passage which is a generally hollow interior 89 for housing the link chain 111, as hereinafter described. The single guide rail 93 of the generally circular opened track portion 91 of the guide rail assembly 25 continues upward as guide rail 100. The exterior guide rail assembly 73 includes a hollow wheel guide channel or track area 95 between the side 100 and the arm 83 and rail 75 of the inverted Y-shaped tracked divider 79 continues up and around the curved portion 29 to the open end 105. The upper end of the exterior carriage wheel guide channel 101 is closed as shown at 105. The hollow central area 107 within the semicircular opened tracked area includes a chain drive assembly 109, as hereinafter described.

The directional arrows shown in phantom lines, represent by reference numeral 123, illustrate the upward movement of the carriage assembly 23 when it moves the gripped refuse container 33 from the down position to the up or dump position, as shown in phantom lines in FIG. 2A. Similar reference numerals for the various assemblies in the up or dump position are designated with "prime symbols" to designate various apparatus in the up position. The directional arrow 125 shows the direction of dumping of the contents of the refuse barrel 33 which empties into the open top loading station 19, as previously described.

In FIG. 2A, the link chain 111 is shown as having a plurality of chain links 113, chain wheels or rollers 115, and chain wheel pins 117 attaching the chain wheels or rollers 115 between adjacent chain links 1]3. A first chain end portion 119 is shown as being operatively housed within the upper end of the chain guide channel 89 of the interior chain guide rail assembly 71 when the apparatus is in its down position, and the second or opposite chain end portion 121 is shown as being within the channel 95 disposed between guide rails 100 and 83 and secured therein by the chain dog 70, as is hereinafter described.

In operation, once the gripping arm assembly 27 has grasped the refuse container 33 to be emptied, it is retracted by the scissors assembly 55 of the carriage assembly 23 and moved back to the home or down position of FIG. 2A. The carriage assembly 23 is then lifted as it is pulled upwardly within the wheel channels 103 by the chain 111 which travels within the chain guide tracks or channels 89 and 103 until the configuration of FIG. 2B shown in phantom lines exists. At this point the carriage assembly 23', gripping arm assembly 39' and trash can 33' are in the full up or dump position.

FIG. 2A has corresponding parts designated by similar reference numerals to those of FIG. 2A with the addition of the prime symbol ('). FIG. 2B shows the link chain 111 as being moved upward through the track or channel 103 between guide rail sides 101 and 75 until the link chain end portion 121 approaches the channel end 105 and the opposite end portion 119 has been drawn into the open chain guide area 107. In this position, referred to as the "up" or "dump" position, the carriage assembly 23 is connected to the gripping arm assembly 39 and secures the exterior surface 35 of the refuse container 33 in its grasp while coming to a relatively sudden stop and causing (because of the momentum of the refuse within the container 33) the refuse to be dumped or emptied through the open or openable container top 37, as indicated by the directional arrow 125.

Figure 3:
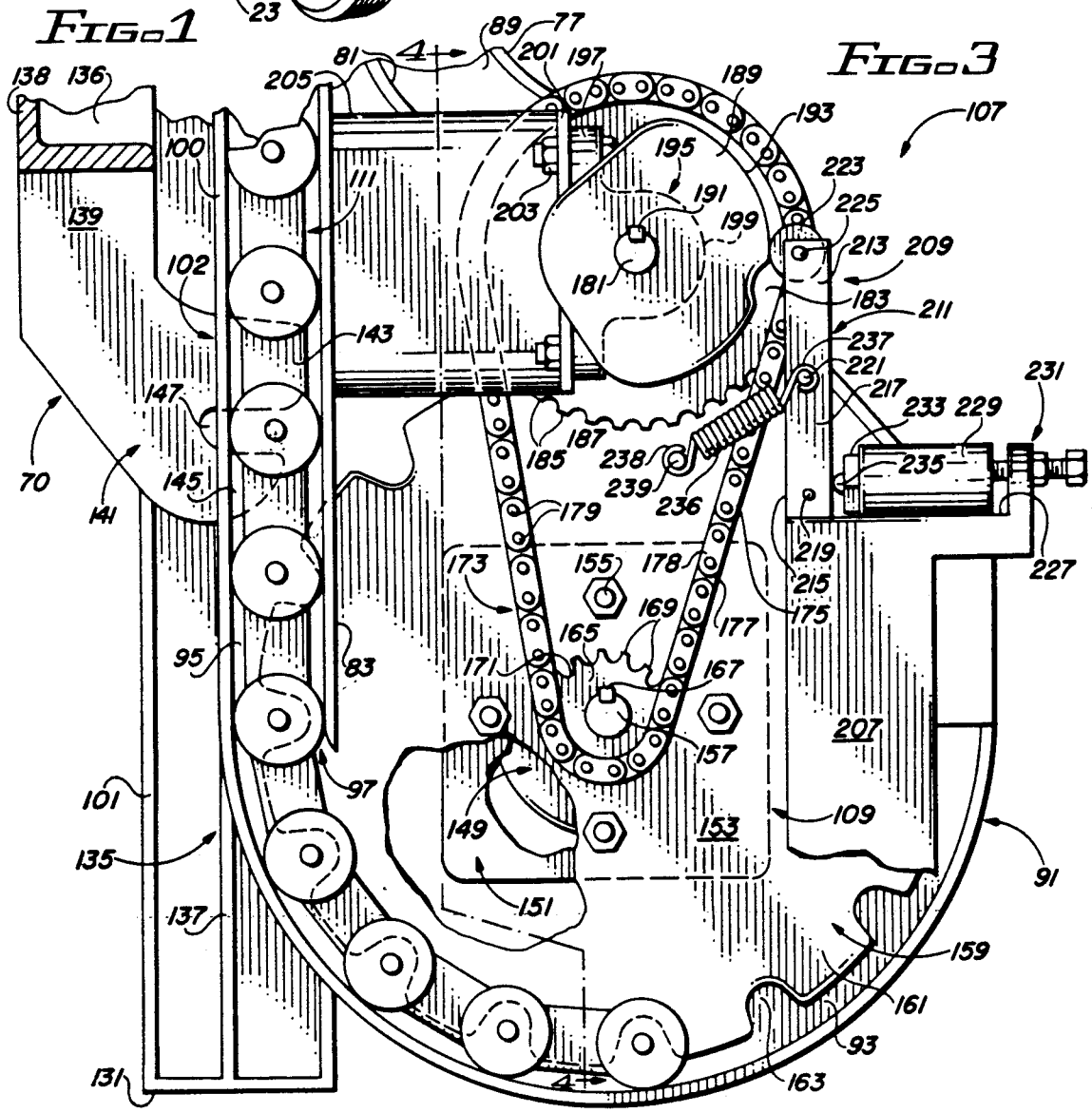
FIG. 3 is a sectional side view of the hydraulic motor drive system of the loader assembly of FIGS. 1, 2A, and 2B.

FIG. 3 illustrates the motor drive assembly 109 of FIGS. 2A and 2B. In FIG. 3, a second inverted Y-shaped rail divider 135 has one leg continuing as guide rail 100 and a first extension branch continuing vertically downward as guide rail 137 with the opposite branch being contiguous with the single sided guide rail 93 of the circular position 91 of the rail assembly 25. The chain dog plate 70 is shown as having its generally rectangular base portion 139 secured by a bracket 138 to a frame portion 136 on the carriage assembly 23. The chain dog 70 is shown as including a front end portion 141 having first and second elongated toe portions 143 and 145, respectively, separated by a chain roller-engaging slot 147. The chain dog 70 engages the links of the drive chain 111 bypassing the front end portion through an elongated slot 102 extending substantially the entire vertical length of the guide rail assembly 25.

The drive assembly 109 is shown as including a conventional hydraulic motor 149 and a gear box 151 covered by a gear box cover plate 153 which is secured thereto via fasteners 155, such as conventional nuts and bolts. The hydraulic motor 149 operates to drive a motor-driven shaft 157 which is keyed to a chain sprocket drive gear 159. The chain sprocket drive gear 159 includes a plurality of peripheral link-engaging teeth 161 separated by a plurality of chain socket engaging slots 163. The shaft 157 is also connected to a timing gear 165 by a conventional key mechanism 167. The timing gear 165 has a plurality of peripheral teeth 169 separated by slots or spaces 171. The timing gear 165 drives a timing chain 173 comprised of a plurality of timing chain links 175, timing chain plates 177, and timing chain pins 179. One portion of the timing gear chain 173 engages the teeth 185 and spaces 187 of a driven timing sprocket gear 183 which is also connected to a driven shaft 181 via the key mechanism 191.

A cam plate 189 is also connected to the driven shaft or cam shaft 181 via a conventional key mechanism 191, and the cam plate 189 includes an outer peripheral surface edge 193 which is contoured for cam action. A shaft-mounting journal housing 195 encircles the shaft 181 and includes a base portion 197 and a domed portion 199 which actually houses the cam shaft 191. A mounting plate 201 is connected to the base 197 of the journal housing 195 via conventional fasteners 203, such as conventional nuts and bolts or the like. A bearing mount housing 205 is connected to the plate 201 since the plate 201 forms the top of the bearing mount housing 205.

A generally vertical support member 207, having a partial horizontal upper surface 227, mounts a cam follow assembly 209. The cam follower assembly includes a pair of parallel plate members 211 separated by a predetermined distance or gap sufficient such that the top end portion 213 houses a cam follower roller or wheel 223 mounted thereto by a wheel axle or pin 225. The upright pair of plate members 211 includes a mid-portion 217 mounting a fixed anchor pin 221 and an upper end portion 213 mounting the cam follower wheel 223 by the wheel axle pin 225.

The upper surface 227 of the support 207 positionably mounts a hydraulic valve 229 having an adjustment mechanism contact member, or push rod 231 at one end thereof and a face plate aperture 233 fixed to the other end. A pressure sensitive rod, control member, or button 235 extends outwardly from the aperture of the face plate 233 to contact a roller secured by an rotationally moveable about pivot pin 219. In this manner, the movement of the pressure-sensitive button 235 is either into or out of the hydraulic valve 229 with the motion of the plate members 211 about the pivot pin 219 as the cam wheel 223 follows the peripheral outer contour 193 of the cam plate 189. The contour of the outer peripheral surface 193 of the cam plate 189 is designed to determine the motor speed and hence the speed of the carriage assembly 23 and arm assembly 27 attached thereto as it is pulled up and down the guide rail assembly 25 by the drive chain 111 for controlling the lifting and dumping operation.

The mid-portion 217 of the pair of upright, spaced apart, parallel plate members 211 is provided with a stationary pivot pin 221 while a second stationary pin 239 is provided interior of the timing chain 173. A spring 236 has one hooked end portion 237 secured about the stationary pivot pin 221 while the opposite hooked end portion 238 of the spring 236 is mounted about the second stationary pin 239 such that the movement of the cam follower assembly 209 is spring-biased to always keep the cam follower wheel 223 pressed against the outer peripheral contoured surface 193 of the cam plate 189 to ensure that the button 219 and hydraulic valve 229 always receives an indication of the actual contour of the peripheral surface 193 at any given place or point about the cam shaft 189 for control purposes.

Figure 4:
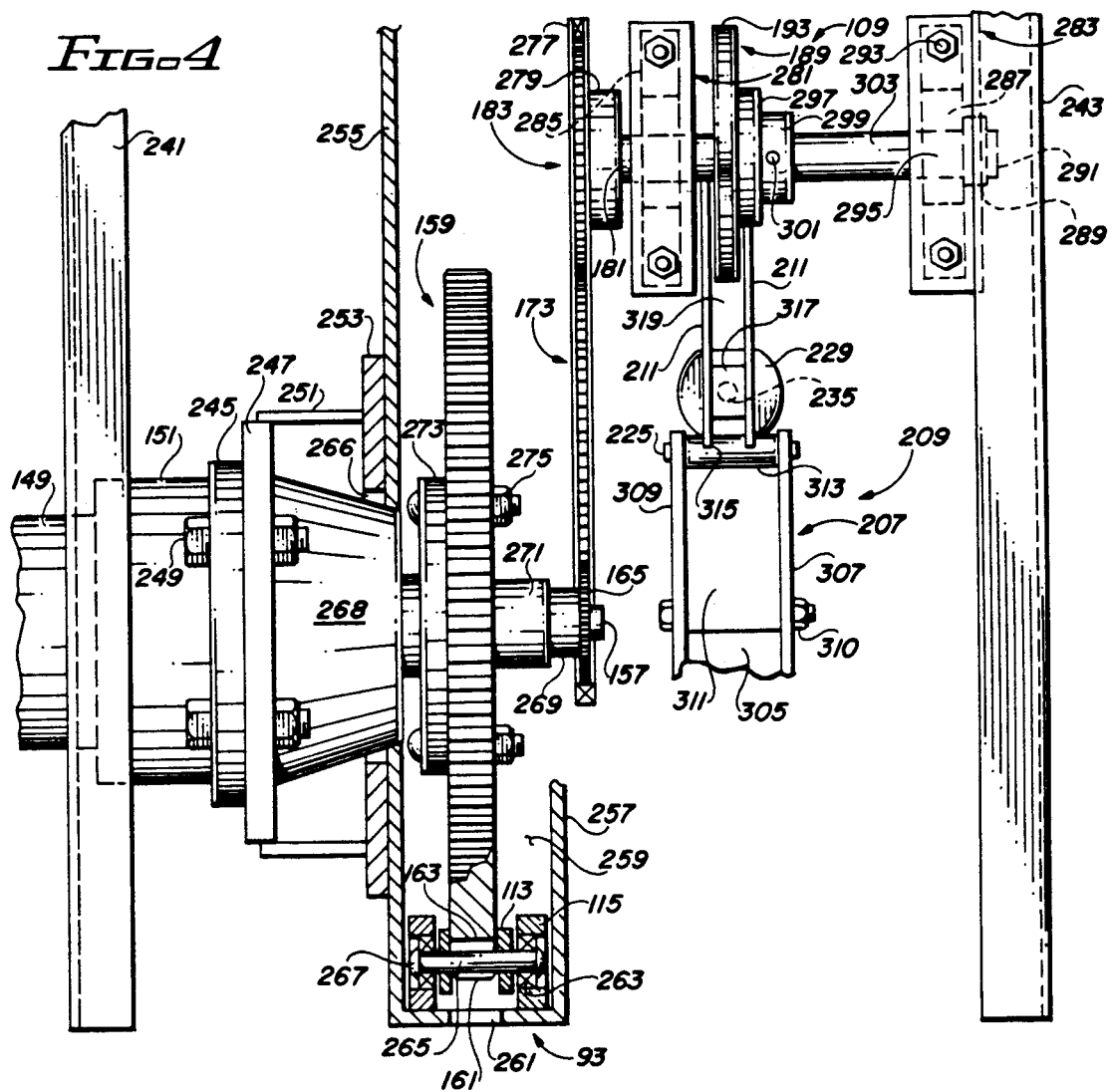
FIG. 4 is a sectional front view of the hydraulic motor drive system of FIG. 3.

FIG. 4 represents a sectional side view of the drive gear assembly 109 of FIG. 3. In FIG. 4, a left vertical guide rail is designated by reference numeral 241 and a right vertical guide rail is designated by reference numeral 243. The hydraulic motor 149 is operatively disposed to the exterior of the vertical upright support rail 241 and the gear box 151 is located interiorly thereof.

The gear box 151 includes a gear box flange member 245 which is secured to a gear box mounting plate 247 via conventional fasteners 249, such as nuts and bolts. The sides of the mounting are designated by reference numerals 251 an a gear box cover plate is represented by reference numeral 253. The cover plate 253 is secured to the vertical guide rail 255, and the cover plate 253 includes a central aperture 266 through which the end portion 268 of the gear box 151 extends. Extending from the gear box 151 is a hydraulic motor drive shaft 271 having a first diameter. The shaft 271 is mounted to the chain sprocket drive gear 159 via a bearing 273 and conventional nut and bolt fasteners 275. The shaft 271 extends outwardly therefrom and becomes a reduced diameter shaft 269 which again reduces its diameter to become the drive shaft extension 157 which mounts the timing gear 165 thereto. One end of the timing chain 173 is operatively disposed about or looped over the timing gear 165 while the opposite end is disposed about or looped over the driven gear 183. Bearings 277 are disposed about the timing gear chain 173. The timing gear 183 is secured to the cam shaft 181 via a bearing plate 279 and a shaft 181 which then passes through a first or left journal housing 281 and later through a second or right journal housing 283. Each of the journal housings include an enclosure portion 285 housing bearings 287 immediately above the shaft 181 and shaft extension 303, respectively. The shaft 181, after passing through the left journal housing 281, is connected to the cam plate 189 via a hub 297 and a collar 299 which is keyed to the shaft 303 by a conventional keying mechanism or pin 301. The end 291 of the cam shaft 303 is journaled within the housing 283 which is fixedly attached to the right vertical guide rail 241 as by weldment or the like. Each of the left and right journal housings 281 and 283, respectively, further include conventional fastener means 293, and each of the bearings 287 include a central aperture 295 for passing the shaft portions 181 and 303 respectively therethrough.

A support 307 mounts the cam follower apparatus 211 and a second parallel support arm 309 is interconnected by fasteners 310, such as conventional nuts and bolts, separated by a space plate 311. The plates 307 and 309 are also connected at the top end thereof via a support arm pivot roller 313 mounted on pivot pin 225. The vertical supports 211 extent upwardly to house the cam follower wheel 223 which is mounted thereto by pivot pin 225. The lower end of the spaced apart vertical supports 211 are connected to the peripheral surface of the roller 313 via weldments 315 or the like. The hydraulic valve 229 is shown as having the pressure-sensitive push button 235 adapted to continuously contact a roller 317 secured thereto by a pin (not shown) attached between the interior surfaces of the vertical supports 211.

FIG. 4 also shows the spaces 163 and teeth 161 of the drive chain gear 159 engaging the corresponding pins 265 of the drive chain 111. The sprocket drive chain 111 is shown as including wheels 115 connected to the shaft or pin 265 via bearings 263 mounted centrally therein. A retainer ring or similar closure means, indicated by reference numeral 267, secures the ends of the pin 265 to the wheels 115. FIG. 4 also shows that the generally semicircular open rail portion 93 includes an outer peripheral aperture or continuous slot 261. With reference to FIGS. 3 and 4, the hydraulic motor 149 is driven through its series of gears within the gearbox 151 to drive the sprocket drive wheel 159 and move the link chain 111 to various up and down positions within the chain guide channels of the rail assembly 25. The shafts 271, 269 and 157 are driven by the hydraulic motor 149 and also turn a timing chain 173 via timing chain gear 165. The timing chain 173 in turn drives a sprocket gear 183 to rotate the cam plate 189 such that changes in the contour of the outer peripheral surface 193 of the cam plate 189 can be sensed by the button 235 of the cylinder or valve hydraulic control 229 to control the speed and acceleration of the operation of the present system, as hereinafter described.

FIG. 5 illustrates, in greater detail, the operation of the cam plate 189 and the cam follower apparatus 209 of FIGS. 3 and 4. FIG. 5 also shows the cam follower wheel 223 which continually tracks the outer peripheral surface contour 193 of the cam plate 189 as being mounted on an axle 225 between the pair of vertical plates or supports 211. The axle may be secured to the plates 211 by conventional nuts and bolts 321 or the like. The outer peripheral contour surface 193 of the cam plate 189 includes a "start" position 325. That portion of operation controlled by the outer peripheral surface 193 between the "start" point 325 and the point 337 is designated by "A". That portion of the outer peripheral contour surface 193 between point 337 and point 339 is designated by "B". The contour surface 193 between point 339 and a point 341 is designated by "C", and the outer peripheral contour surface 193 between points 341 and 343 is designated by "D". That portion including the dip in the outer peripheral surface contour 193 of the cam plate 189 between points 343 and 345 is designated as "E", and the outer peripheral surface contour 193 between point 345 and point 347 is designated by "F". Lastly, the outer peripheral contour surface 193 between point 347 and the starting point 325 is designated by the letter "G".

It will be noted that the entire outer peripheral contour 193 will be continually and continuously tracked by the cam follower wheel 223 because of the bias of the spring 236 which rotates the arms 211 supporting the cam follower wheel 223 about the pivot point 219, thereby moving the contact roller 317 against the pressure sensitive control button 219 pressing it into and allowing it to move outward from the control value 229 for control purposes. During the time that the cam follower wheel 223 tracks the contour surface"A", the carriage assembly 23 and drive chain 111 are accelerating to a first predetermined full speed. While the cam rotates over the interval "B", the drive chain 111 and attached carriage assembly 23 travel upwardly at full speed. During the interval "C", deceleration occurs until a second steady state speed of approximately thirty-five percent speed is maintained until the start of the "E" interval where rapid acceleration is begun and continued. A very rapid deceleration occurs during the "F" interval for producing a "snap" action or jerk to help empty the contents of the refuse container. The interval "G" is a dead space which is not used since at the end of the "F" interval, the process reverses itself backward to the "start" position. FIG. 2B shows the approximate position of the carriage assembly 23 along the rail assembly 25 during each interval and at the transitions. This cam control operates the speed, acceleration, and deceleration of the hydraulic drive motor 149 via the control valve 229 to minimize the time required for each pick-up, dump, and drop-off cycle while simultaneously maximizing dumping efficiency due to the"snap action" produced at the dump position.

Figure 6A:
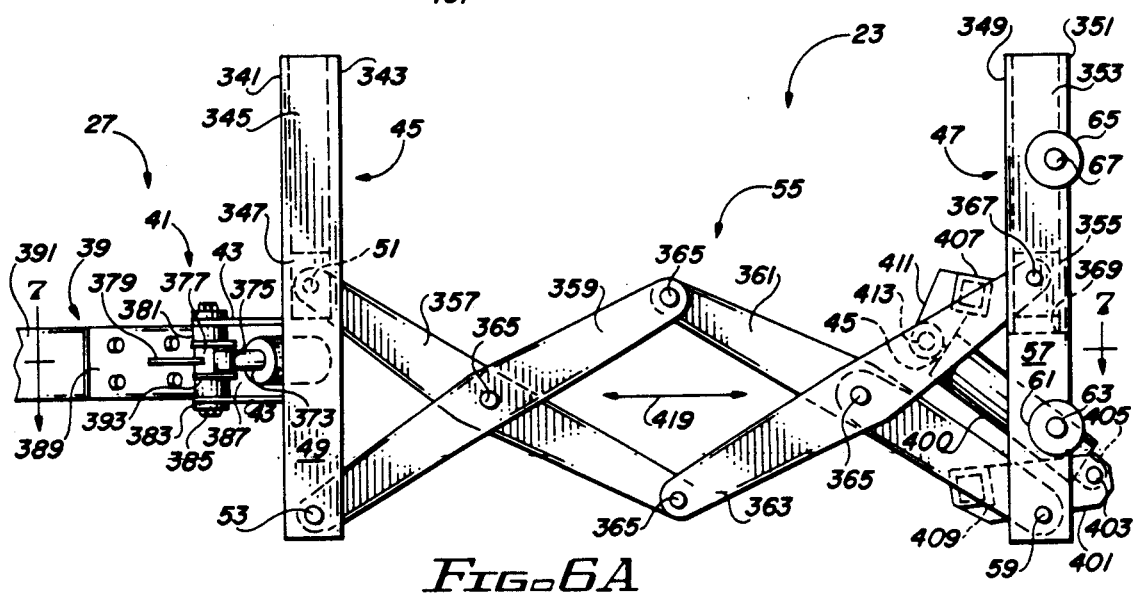
FIG. 6A is a side view of the carriage apparatus of the present invention in the extended "pick-up" position which illustrates the scissors assembly thereof.

FIG. 6A shows the carriage assembly 23 including the movable carriage support assembly 45 and the stationary carriage support assembly 47 together with the scissors assembly 55 operatively connected therebetween, and a portion of the gripping-arm assembly 27 and the arm-operating assembly 41 to be hereinafter described. The movable carriage support assembly 45 is shown as including substantially vertical carriage support sides 341 and 343 forming a path or channel 345 having a generally rectangular or square cross-section. A sliding block 347 is operatively housed within the channel 345 for up and down reciprocal movement therein, and said block 347 is used in conjunction with the scissors assembly 55 as hereinafter described. The fixedly positioned vertical carriage support assembly 47 is shown as including a pair of spaciously separated, generally parallel sides 349 and 351 forming a hollow channel 353 therein having a similar rectangular or square cross-section which houses a second sliding block 355.

The scissors assembly 55 includes a first outer scissors arm 357, a second outer scissors arm 359, a first inner scissors arm 361, and a second inner scissors arm 363. One end of the first outer scissors arm 357 is connected to the sliding block 347 via pivot pin 51, and the opposite end is connected to one end of the second inner scissors arm 363 via pivot pin 365. The opposite end of the scissors arm 363 is connected to the sliding block 355 of the fixedly positionable carriage support arm assembly 47 via pivot pin 367. Similarly, one end of the scissors arm 359 is connected to the movable carriage support assembly 45 via pivot pin 53 while the opposite end is connected to one end of the scissors arm 361 via pivot pin 365. The opposite end of the scissors arm 361 is connected to the fixedly positionable carriage support assembly 47 via pivot pin 59. The mid-portions of the scissors arms 357 and 359 are connected together by the pivot pin 365 and, similarly, the mid-portions of the scissors arms 361 and 363 are connected together via pivot pin 365. The end of the rectangular channels 345 and 353 are closed at the bottom as indicated by reference numeral 369 to limit the motion of the sliding blocks 347 and 355 in the downward direction. Channels 345 and 355 are open at both ends and motion is limited by the extremities of the stroke of the actuating hydraulic cylinder 400.

FIG. 6A also show a refuse barrel-gripping hydraulic cylinder 371 having a piston rod 373 extending therefrom and connected to the piston attachment assembly 375. A plate member 377 is connected to the cylindrical member 381, as by welding or the like and includes a cylindrical collar 381 comprised of members 393. A nut 385 and washer 383 connect opposite ends of the cylindrical member 381 to the spaced apart parallel sides 43, and the gussett plate 379 is fixedly attached, as by welding or the like, to the elongated member 389. The open area 387 between the rails 43 house the hydraulic cylinder 371, and the cylindrical member or rod 381 the gripping arm base plate 389 is stationary while the assembly 41 is connected to the left gripping arm 391 via the collar assembly 393. The cylinder's clevis plates 393 and 377, along with the gussett plate 379 and the grip base plate 389 are welded to support plates 43 with a collar weldment 383 so as to be pivotable about axis pin 385.

In operation, the hydraulic cylinder 371 positions the rod 373 for opening and closing the arm assembly 39 of the barrel-gripping assembly 27, as hereinafter described with reference to FIG. 6B.

A second hydraulic cylinder 400 has its piston rod 415 coupled to a plate 411 via a pivot pin 413. The opposite end of the plate 411 includes an upper cross member 407. Similarly, a plate 401 connects the opposite end of the piston rod 405 to the plate 401 via pin 403 while the opposite end of the plate 401 includes a lower cross member 409. The operation of the hydraulic cylinder 400 and the positioning of the piston rod 415 controls the opening and closing of the scissors assembly 55 and therefore the positioning of the barrel-gripping assembly 29 towards and away from the side 30 of the truck 13. Bidirectional arrow 419 indicates that the direction of movement of the scissors assembly 55 and hence the movement of the moveable carriage support assembly 45 with respect to the stationary support assembly 47 is generally horizontal and laterally towards and away from the side 30 of the truck 13.

FIG. 6B illustrates the scissors assembly 55 of FIG. 6A in a partially closed position with the movable carriage support assembly 47 having been moved toward the stationary carriage support assembly 47 as indicated by the direction of motion arrow 429. The direction of motion arrows 425 and 427 show the direction of motions of the scissors arms 357, 359 and 361, 363 with respect to one another as they rotate about the pivot pins 365 for opening and closing the scissors assembly 55, as known in the art. The reference numbers followed by the "prime" symbol (') indicate the original position of the movable carriage assembly 45' and the arm 359' attached thereto via pivot pin 53'. The direction of motion arrow 429 indicates the direction of movement of the movable carriage support housing 45 as the scissors assembly 55 closes toward the home position under control of the hydraulic cylinders 400 and the pistons 373 associated therewith. The direction of motion arrow 431 indicates the direction of vertical movement of the sliding block 355 within the hollow channel 353 under control of the raising of one end of the scissors arm 363 attached thereto by pivot pin 367. In the fully closed position, as shown in FIG. 2A, the movable vertical support assembly 45 will substantially abut the fixedly position carriage support assembly 47 and the scissors assembly 55 will be folded into a closed position as shown in FIGS. 2A and 2B.

Figure 7:
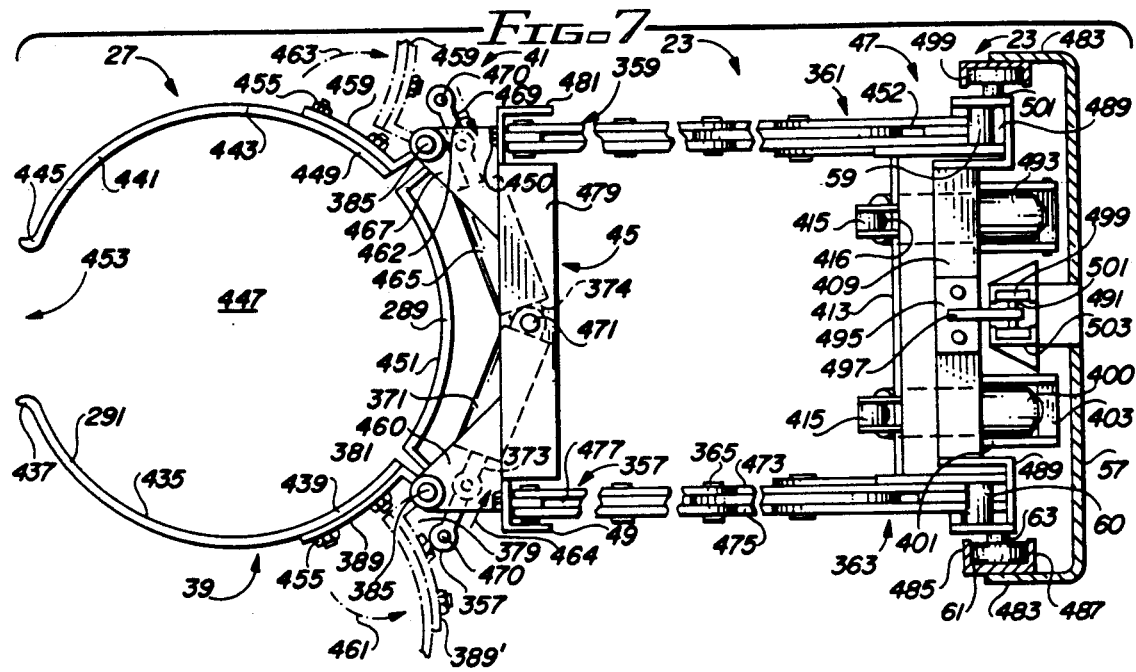
FIG. 7 is a top view of the carriage assembly of the present invention including the scissors assembly and container-receiving, gripping or engaging apparatus thereof.

FIG. 7 illustrates a top view of the carriage assembly 23, including the movable carriage assembly 45, the fixedly positioned vertical carriage support assembly 47, and the scissors assembly 55 connected therebetween. It also illustrates the container gripping assembly 27 including the arm assembly 39 and the arm-operating assembly 41 of the present invention.

The arm gripping assembly 27 is shown as including a left gripping arm 291, a right gripping arm 441, and a stationary gripping base member 451. The distal end of the left gripping arm 291 is represented by reference numeral 437 and the distal end of the right gripping arm 441 is designated by the reference numeral 445. Normally, the distal ends 437 and 445 are separated by a gap 453 even when the arms 291 and 441 are in the closed position as indicated in FIG. 7. The left gripping arm 291 includes an interior gripping surface 435, the right gripping arm 441 incudes an interior gripping surface 443, and the base member 289 includes an interior can-gripping on abutting surface 451. The hollow interior 447 between the gripping arms 291, 441, and the base 289, respectively, is sized or dimensioned to fit a particular size range and shape of refuse barrels, containers or cans, as previously described. The opposite end portion 439 of the left gripping arm 291 is attached to a gripping arm base 389 via conventional fasteners 455, such as nuts and bolts or the like. Similarly, the opposite end portion 449 of the right gripping arm 441 is attached to a gripping arm base 459 via fasteners 455. The gripping arm bases 389 and 459 are generally L-shaped with the long leg secured to the end portions 439 and 449, respectively, by fasteners 455, while the end of the short legs of the L-shaped bases 389 and 459 are attached to moving cylindrical collars 381 which pivotally turn upon the pins 385 under operation of the hydraulic cylinders 371 and 465, respectively.

One end of each of the piston rods 374 of each of the hydraulic cylinders 371 and 465, are connected via a common pivot pin 471 while the opposite piston rods 373, 469 of the cylinders 465 and 371, respectively, are by-directional piston rods 373, 469 whose outermost end is attached to the upper surface of the gripping arm base 389 via the pair of fin member 379 and attachment means 357, such as a conventional weld or the like. A plate 460 is associated with left portion of the movable carriage support assembly 45 while a plate 467 is operatively associated with the right hand end portion thereof. The plates 460 and 467 are pivotally attached to the outer ends. Another end portion of the generally triangular bracket plates 460 and 467 are attached to the outermost ends of the piston rods 373 and 469, respectively, via pivot pins 470, and then fixedly secured as by welding or the like, as indicated by reference numeral 357, to the L-shaped plates 389 and 459, respectively, and the corresponding fin members or extensions 379. The movable vertical support member or carriage support 45 is shown as including the cross-member 479 having opposite end portions 49 and 481, respectively. The left hand scissors arms 357 and 363 are connected to the left hand end portion of the vertical support assembly 45 via conventional fasteners 450 while the opposite pair of scissors arms 359 and 361 are connected to the right hand end portion of the vertical carriage support assembly 45 via fastener members 450. The opposite right hand ends of the scissor assembly 55 are attached via pivot pins 59 and 60 to the opposite ends, respectively, of the cross-member 409, as further illustrated in FIG. 6A.

Both the left and the right arm configurations of the scissors assembly 55 are identical and each includes a pair of x-plates substantially parallel to one another and spaced a predetermined distance apart for defining the inner X-plate 477 therebetween. The opposite pairs of x-plates 473 and 475 are connected via the pivot pins 365, which were previously described in FIGS. 6A and 6B. Both the left and the right portions of the stationary carriage assembly 47 include wheels 61 mounted on an axle 63 and journaled within the tracked member having opposite guide rails 485 and 487, respectively. A pair of hydraulic cylinders 400 and 493 control both the left and right sets of arms of the scissors assembly 55. Each of the hydraulic cylinders 400 and 493 includes one piston end secured to the plate 403 while the opposite moveable end is secured by member 415 and fastener 416. The members 415 are secured to the cross-member 413 for moving the scissors assembly with respect to the pivot pins 59 of the fixedly positioned carriage support assembly 47. An aperture 491 is shown to be centrally disposed within the vertical support member or rail 57. The rib 497 is fixedly secured to the plate 495 as by weldment or the like and is pivotally connected to axle 501 having opposite wheels 499 disposed within the opposite rail guides 503.

In operation, the hydraulic cylinders 400 and 493 move their piston rods, not shown in FIG. 7, in and out to push or pull the member 413 thereby actuating the extension or retraction of the scissors assembly 55, as known in the art.

Figure 8:
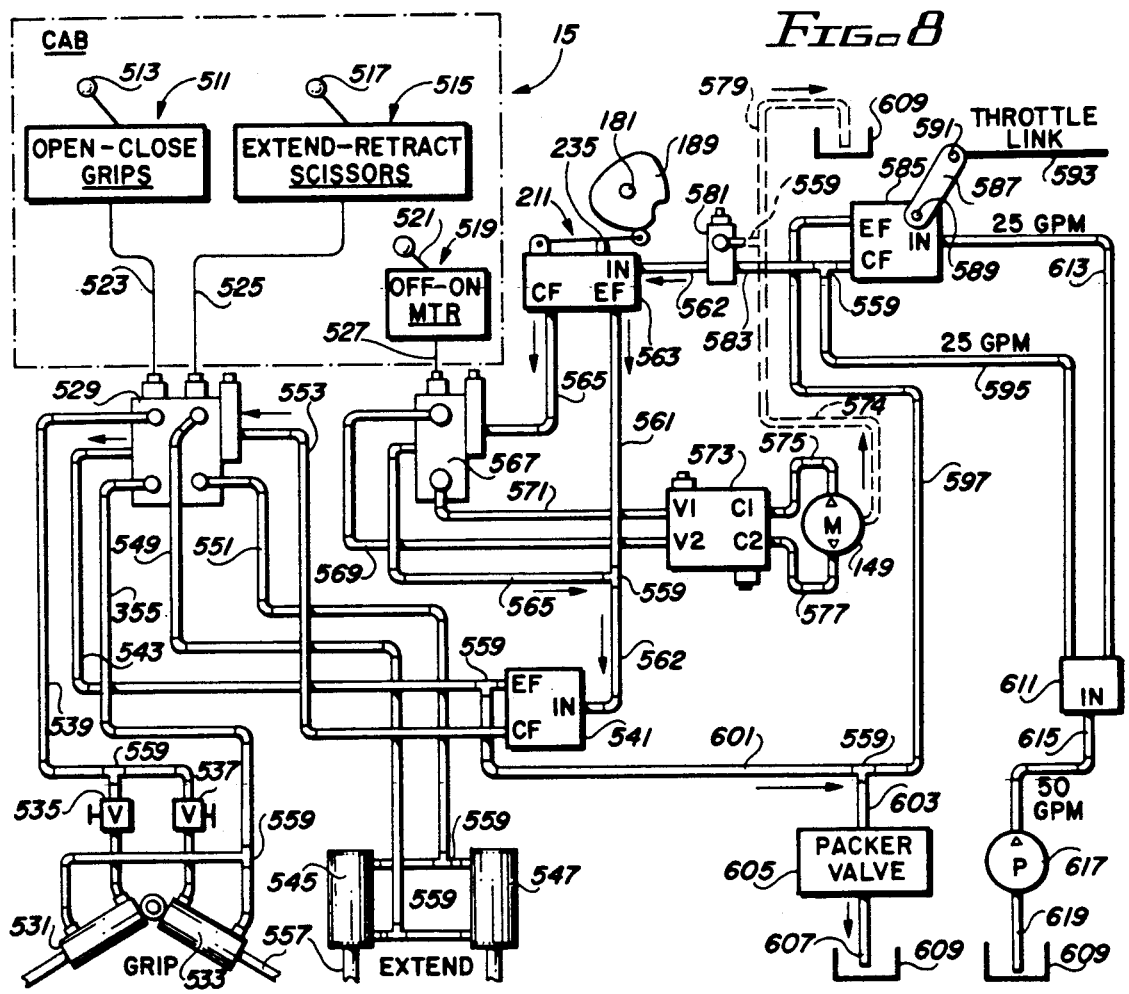
FIG. 8 is a schematic diagram of the hydraulic system of the loading assembly of the present invention.

FIG. 8 shows that the refuse truck cab 15 of the present invention includes an open-close arm gripping control unit 511 having a control stick 513; an extend-retract scissors control unit 515 having a control stick 517; and an on-off motor control unit 519 having a control lever 521. The output of the open-close arm-gripping control unit 511 is taken from push-pull cable 523 to operate a first spool-type hydraulic valve assembly 529. Cable 525 connects the extend-retract scissors control unit 515 to a second spool-type hydraulic valve assembly 529. Lastly, cable 527 connects the on-off motor control unit 519 to the spool of hydraulic valve 567.

One outlet port of the hydraulic valve assembly 529 is connected via the tube, hydraulic line, or pipe conduit 539 and T-joint or coupling 559 to the first or forward inputs of a pair of control valves 535 and 537 which form the input of the pair of hydraulic arm-gripping cylinders 531 and 533, respectively. The cylinders 531 and 533 include movable piston rods 557 having their bases commonly coupled via pivot pin 471. For reverse operation, an input port of the hydraulic valve assembly 529 is connected via tube or conduit 355 and T-joint coupling 559 to the opposite end of the hydraulic arm-gripping control cylinders 531 and 533, respectively. Another output port of the hydraulic valve assembly 529 is taken via hydraulic line 551 to input, via a T-coupling 559, at one end of a pair of a hydraulic cylinders 545 and 547 which control the extension and retraction of the scissors assembly 555, as previously described. Similarly, the opposite ends of the hydraulic cylinders 545 and 547 are connected via T-joint 559 and through a hydraulic line or tube 549 to another input port of the hydraulic valve assembly 529 for reverse operation. The last pair of ports of the hydraulic valve assembly 529 are connected to opposite ends of the hydraulic tubes or conduit 543 and 553, respectively, whose opposite ends are connected to the pair of flow divider outputs EF (Excess Flow) and CF (Controlled Flow) output of the second priority divider valve 541. A T-coupling 559 at the EF output of the priority divider valve 541 is connected to line 543 and simultaneously to the hydraulic line 601, which in turn, is connected via T-coupling 559 to both a tube 603 serving as the input of the packer valve 605 whose output is taken on line 607 to the reservoir 609; and via conduit 597 to the EF output of a third priority divider valve 585. The CF output of the priority divider valve 585 is connected through a T-coupling 559 and thence via hydraulic line 583 to the input of a relief valve 581 and, via hydraulic line 595, to one output of a flow divider valve 611. The other output of the flow divider valve 611 is connected via hydraulic line 613 to the input of the flow divider valve 585. The flow divider valve 585 has associated therewith a movable throttle link 587 which is pinned to the divider via connector 589 and at the opposite end to a throttling cable or link 593 via pin 591. The input of the flow divider 611 is taken from hydraulic line 615 which has its opposite end connected directly to the hydraulic pump 617 having an inlet 619 from the reservoir 609.

The EF output of the priority divider valve 585 is connected via hydraulic line 597 and T-coupling 559 to the input of the packer valve 605 via tube 603, as previously described, and the CF output is connected via T-coupling 559 and hydraulic line 583 to the relief valve 581, as previously described. As illustrated in phantom lines, one output of the relief valve 581 is taken via T-coupling 559 and hydraulic output line 579 to the reservoir 609 and, via the T-coupling 559 and hydraulic line 574, to the case drain of the hydraulic motor 149. The hydraulic motor 149 is connected to the C1 port of a balance valve 573 via hydraulic line 575, while the opposite port of the hydraulic motor 149 is connected via hydraulic line 577 to the C2 output of the balance valve 573. The VI port of the balance valve 573 is connected via hydraulic line 571 to one port of a spool-type control valve 567 whose opposite port is connected via hydraulic line 569 to the V2 port of the balance valve 573.

The output of the pressure relief valve 581 is connected directly to the input of a regulator valve 563 whose CF output is connected via hydraulic line 561 and T-coupling 559 to the input of the priority flow divider 541 while the stem of the T-coupling 559 also receives an input, via hydraulic line 565, from a port of the spool-type control valve 567. The CF port of the regulator valve 563 is connected via a hydraulic valve 565 to the input of the spool-type control valve 567 to complete the hydraulic circuit or system of FIG. 8. The regulator valve 563 is controlled by the movable button or control rod 235 which contacts the cam follower arm assembly 211 which follows the outer peripheral contact surface of the cam 189 as it rotates about axle 181, as previously described.

In operation, the control lever 513 controls the operation of the open-close arm gripping control unit 511 and uses a push-pull cable 523 to shift the spool of the hydraulic valve assembly 529. The valve 529 will cause hydraulic fluid to flow through the restrictor or restriction valves 535 and 537, via hydraulic line 539, to open the arm-gripping assembly by moving the piston rods 557 outwardly and to retract the piston rods inwardly by supplying hydraulic fluid to the opposite ends of the cylinders 531 and 533 via hydraulic line 355 and the T-coupling 559. Similarly, when hydraulic fluid is fed through line 551 to the rear end of the hydraulic cylinders 545 and 547, the piston rods 557 extend thereby moving the scissors assembly inwardly, and when fluid is supplied via hydraulic line 549 to the opposite end of the cylinders 545 and 547, the scissors assembly is caused to extend outwardly as the piston rods 557 are drawn back into the cylinders 545 and 547, respectively.

The on-off motor control actuates the push-pull cable 527 thereby shifting the spool of the control valve 567 to feed hydraulic fluid to the VI or V2 input, via hydraulic lines 571 or 569, respectively, for controlling the direction of operation of the hydraulic motor 149 in either the forward or reverse direction. The pump 617 supplies hydraulic fluid from a reservoir 509 to the input of flow divider 611 via a hydraulic line 615, and the divided hydraulic fluid flows through either or both of the hydraulic lines 595 and 613, either to the T-coupling 559 or the input of the valve 585. The motor speed control is automatically determined by the cam follower apparatus 211 and valve 563 as the cam follower wheel follows the outer peripheral contact surface or contour of the cam plate 189 is effected by dividing the hydraulic fluid flowing into the valve 235, via hydraulic line 562 and out of the valve 235 via output hydraulic lines 565 or 561, respectively. By using the hydraulic circuit or system of FIG. 8, all hydraulic functions of the system can be controlled either manually or under control of the cam follower assembly 211, as previously described.

In operation, hydraulic fluid flowing into the input port of the regulator valve 563 (which corresponds to the control valve 229 of FIGS. 3 and 4) is divided into two streams via the control flow output port "CF" and the excess flow output port "EF". The controlled flow from output port CF is supplied via hydraulic control valve 567 where it is then fed from an output port and conduit 571 to the V input port of a directional valve 573 whose C1 port is connected to the hydraulic motor 149 via conduit 575. The hydraulic motor 149 is also connected via conduit 577 to port C2 of value 573 which, in turn, has its V2 port connected via hydraulic lines 569 to a port of the hydraulic control value 567. This enables the cam plate 189 to control the flow and quantity of hydraulic fluid to the hydraulic motor 149 thereby precisely controlling the speed, acceleration and deceleration of motor 149. Hydraulic fluid exits control valve 567 via hydraulic line 565 and rejoins the EF port of value 563 at the T-coupling 559 via hydraulic line 561, so that a full volume of hydraulic fluid enters the priority valve 541 via hydraulic line 562. This controlled flow allows the system operator to very precisely control the speed of container gripping, the speed of extension and retraction of the gripping arm assembly, etc. by proper adjustments of the spool shift of control valve 529. The hydraulic fluid exiting an output port of value 529 via hydraulic line 543 and recombines with the excess flow from valve 541 thereafter returning the total fluid volume to supplement the packers system of the trucks 13.

In FIG. 8, the following components were used in the preferred embodiment of the present invention although it would be obvious to one of the ordinary skill in the hydraulics art to substitute equivalents at will. Hydraulic motor 149 is preferably a conventional "CHARLYN 2000"; gear box 151 is a conventional "HECO #16"; and flow divider valve 611 is preferably a "B50" flow divider as manufactured by Brand Corporation. Hydraulic valve 585 is preferably a "RD175-30" such as manufactured by Prince Hydraulics and relief valve 581 is preferably a model "RD1875H (set at 2000 psi) as made by Prince Hydraulics. Valve 563 is preferably a model "RD575" (modified to operate with a sliding plunger 235) as made by Prince and valve 567 is a single spool control valve such as a model "RD513CA1A1A1" by Prince. The fluid control valve 573 is preferably a counterbalance valve such as a model "IEE13" manufactured by Fluid Controls, Inc. and is used for preventing the hydraulic motor 149 from overrunning. Hydraulic Value 529 is a two-spool control value such as a model "RD522CA3A1A1" by Prince and valve 541 may be a priority divider valve such as a model "RD175-30" priority divider made by Prince. Values 535 and 537 are needle valves such as model "N25B" manufactured by Deltrol, Inc. Relief valve 563 may be a model "RD700" pilot operated relief valve as made by Prince Hydraulics. Publications on these and similar hydraulic valve products are conventionally available and are incorporated by reference herein to augment the understanding of the apparatus and operation of the system of FIG. 8 if such is needed by those skilled in the art.

FIG. 9 shows an electrical schematic diagram illustrating the electrical system of the present invention. The power input is taken via input lead 631 to one contact 639 of a power on/off switch 635 via electrical fuse 633. The opposite contact 640 of the switch 635 is connected directly to a first contact 643 of a second stop switch 641. The movable switch member 637 of switch 635 is normally opened in the "off" position but it can be closed on the contacts 639, 640 to supply electrical power to the second stop switch 641. The opposite contact 645 of the second switch or stop switch 641 is connected via lead 649 to a node 651. The moveable switch member 647 of the switch 641 is normally opened to the "off" position to prevent the flow of electricity across the contacts 643 and 645 but it can be closed on the contacts 643, 645 to complete the connection.

Node 651 is connected via lead 653 to a moveable switch contact arm 693 of a momentum switch 159. The down contact "DWN" of the switch 159 is connected via lead 691 to node 677 while the up contact "UP" is connected via lead 689 to node 687. Node 677 is connected to the up contact "UP" of the detent switch 157 while the down contact "DWN" is connected directly to node 687. In this manner, the movable switch arm 693 of the momentary switch 159 can be moved to the left contact DWN for supplying down current or the moved to the right contact UP to supply up current. Similarly, movable switch contact arm 681 of the detent switch 157 can be moved to the left contact UP for controlling up movement or to the right contact DWN for controlling down movement. The down contact DWN, which is connected directly to the node 687, is then connected via lead 685 to one normally closed contact of a first double pole-double throw switch 725, and the up contact UP, which is connected directly to node 677 is also connected via lead 679 to one normally closed contact of a second double pole-double throw switch 673. The other normally closed contact of the first double pole-double switch 671 is connected via lead 721 to the up output UP of the control unit 165, and the double pole-double throw switch member 725 is normally positioned across the normally closed contacts connected to leads 685 and 721, respectively. The opposite pair of switch contacts are normally unconnected, as are the opposite pair of switch contacts to the second double pole-double throw switch 673. As described, the normally closed contacts of the second double pole-double throw switch 673 are connected to leads 679 and 723, respectively. A third double pole-double throw forward/reverse switch 675 has one normally closed contact connected via lead 731 to a node 730, and its opposite closed contact connected via lead 733 to a node 717. The first normally unconnected forward contact of the third double pole-double throw forward/reverse switch 675 is connected directly to node 730 while the forward contact is connected via lead 683 to the control switch arm 681 of the detent switch 157.

Node 730 is connected via lead 655 to node 651, and node 651 is the input power input node which is connected via lead 649 back to the switch contact 645 of the stop switch 647. Node 651 is also connected via lead 653 to the movable contact arm 693 of the momentum switch 159. Node 719 is connected directly to the "P" input of controller 157 and via lead 697 to the forward output "FW" of the controller 165. Node 719 is also connected via lead 695 to the normally-opened forward contact FW of the forward/reverse switch 161. The opposite normally-opened reverse contact REF of switch 161 is connected via lead 703 to a node 705. Node 705 is connected directly to the "P" input of a second controller 169 and via lead 707 to the first reverse output REV1 of controller 165. Moveable switch arm 700 of switch 161 is connected to the control arm 713 of a open/close gripping arm switch 163. One open contact CL of switch 163 is connected via lead 709 directly to the grip open control port GRP of the control unit 165 while the reverse contact REV is connected via lead 711 to the second reverse port REV2 of the first controller 165. The down port DWN of controller 165 is connected via lead 723 to the second closed contact of the second double pole-double throw switch 673 while the up port UP of the first control unit 165 is connected via lead 721 to the second normally closed switch contact of the double pole-double throw up switch 671.

The "S" output of the second controller 167 is connected directly the ground while the "H" port is connected directly to node 717. Node 717 is connected via lead 733 to the second normally closed reverse contact REV of the third double pole-double throw forward/reverse switch 675. Node 717 is also connected via lead 715 to the "H" port of the third controller 169 whose "P" port is connected directly to node 705. Node 705 is connected via lead 703 to the reverse contact REV of the forward/reverse switch 161 and via lead 707 back to the first reverse port REV1 of the first controller 165, as previously described. The "P" output of the second controller 167 is taken directly from node 719 and supplied by a lead 697 back to the forward input FW of the first controller 165 and via lead 695 to the forward contact of the forward reverse switch 161. The control units 165, 167 and 169 are used as an alternative to the manually controlled valves of the hydraulic system of FIG. 8. They comprise three series-connected or tandem solenoid-actuated control valves each including an electrical solenoid on each end for pushing or the spools of the hydraulic valves of FIG. 8 when voltage is applied thereto. The controllers 165, 167 and 169 may be, for example, tandem center model "MV4-43" manufactured by Fluid Power Systems, Inc.

It will be seen that the operation of the various switches can be used to control the opening and closing of the gripping arm assembly, the forward extension and reverse retraction of the scissors assembly and the up or down movement of the carriage assembly via the main drive chain.

FIG. 10 shows an improved refuse truck system 741 of a second embodiment of the present invention. The improved refuse truck system 741 includes a refuse truck 743 having a cab portion 745 in which the driver and/or a helper, operator or assistant ride, and a bed portion 747 which is provided with a movable loader assembly 749. The loader assembly 749 includes a guide rail assembly 751, a gripping arm assembly 753, a carriage assembly 755, a drive assembly 757, and a longitudinal loader movement assembly 759.

The bed portion 747 of the refuse truck 743 includes a frame 761 below the bottom 763 of the bed 747. A hydraulic cylinder 765 controls the dumping of the contents of the bed 747 by lifting same about the dump pivot pin 1003, as known in the art. The bed portion 747 of the refuse truck 743 of FIG. 10 includes a plurality of separate and distinct compartments for different types or mixes of refuse such as a first compartment for glass, a second compartment for paper, a third compartment for metal, a fourth compartment for garbage, and the like. Depending on the number of separations required of the homeowners whose refuse is being collected, any given number of separate and independent compartments or bins can be provided, as desired. It will also be understood that whenever the term only one type of refuse, trash or garbage is used herein, the term may refer to a given mix of predetermined types, such as bottles and cans in one bin, paper and plastic in another bin, etc. The same applies when referring to a collection container, can or barrel, as well. In FIG. 10, the bed 747 of the refuse truck 743 includes a first bin or compartment 767, a second bin or compartment 769, a third bin or compartment 771, a fourth bin or compartment 773, and a fifth bin or compartment 775. The number of separate and distinct bins is irrelevant provided at least a plurality of bins or compartments are provided.

The entire top of the refuse truck 743 of the second embodiment of the present invention includes an open top 777, a bed tail gate 779, and a fixed front end panel 789. A plurality of hangably-connected and fixedly-retainable partitions or panels are provided to separate one storage bin from the next. For example, a first partition 781 separates the compartment or bin 767 from the second compartment or bin 769. A second partition 783 separates the compartment 769 from the compartment 771; a third partition 785 separates the compartments 771 from the compartment 773; and the fourth partition, separator or divider 787 separates the compartment 773 from the compartment or bin 775. In the preferred embodiment of the present invention, each of the partitions, panels or bin dividers is a substantially flat, generally rectangular, planar panel member whose width is substantially equal to but less than the width of the hollow interior of the bed and whose height is substantially equal to the height of the hollow interior of the bed.

The refuse truck 743 of the present invention includes a set of rear wheels 790 and front wheels 792. A hose and cable conduit system 793 is provided longitudinally along the mid-portion of the side 790 of the refuse truck 743. Furthermore, a longitudinal upper rail or track assembly 795 is provided along the top portion of the side 790 and a lower rail or track assembly 797 is provided adjacent the lower end portion of the side 790. The direction of motion in either the left or right longitudinal direction is back and forth along substantially the entire length of the side 790 of the bed 769 of the refuse truck 743, as indicated to the right by direction of motion or directional arrow 799 and to the left, as indicated by direction of motion arrow 801. A control box 803 is shown as being mounted on the exterior of the cab 745 so that the assistant operator, driver, or helper can get out of the truck cab 745 to operate the controls of the panel 803 under normal circumstances. The panel 803 could also be provided within the cab 745, as previously described, or even in both locations if desired.

A remote sensor 808 may be provided along the side 790 of the truck 743 or mounted on an intermediate portion of the rail assembly 749 to automatically read the indicia on the gripped containers as it is being lifted along the rails. The indicia used on the refuse containers may be any machine readable code such as a bar code, an OCR code, etc. and the optical sensor connects to the electronics system which can include a conventional bar code reader, Optical Character Recognition reader decoder or any such conventional device. Since we select one of only a few bins, the system would be very simple.

In operation, the refuse truck 743 would proceed along its route until it reaches a first pick-up station. At that point, it would position itself laterally across from the first refuse can which is color-coded, marked by indicia, or the like to indicate whether its contents are glass, metal, paper, aluminum cans, garbage, or the like or some predetermined mix, combination or assortment thereof. Since each of these refuse containers or cans is to be dumped into a separate compartment or bin in the bed 747 of the truck 743, the driver or assistant must take notice of the particular color code of the can being picked up each time. The operation of the loader assembly 749 is similar to the description previously given herein except that once the refuse can is brought back to the down position adjacent the side 790 of the truck 743, it is moved longitudinally to the left or to the right as indicated by the directional arrows 801 and 799 until it is abeam the particular compartment in which the contents (either a given single type of refuse or a predetermined mix) of that coded can are to be dumped. Once it is properly positioned, it will be lifted and dumped into that compartment, as previously described. The truck 743 can then be moved to position it adjacent the next colored-coded can to be dumped, but preferably, the loader assembly 749 is longitudinally moved along the side 790 to a position adjacent the next refuse can to be emptied and the carriage is extended by the scissors assembly to grasp the refuse can and retrieve it to the home or down position before being longitudinally moved to a position adjacent to the proper compartment in the bed 747 of the truck 743. Once positioned, the assembly lifts the can and dumps its contents into the proper compartment, and then it returns for the next color-coded can, or the like, until all refuse cans at that station have been emptied into the proper compartments or bins of the truck 743. The truck then drives on to its next designated pick-up station and repeats this procedure until the truck is full or all cans on its route are emptied. It then returns to a central refuse collection facility or dump site and empties the compartments on a one-at-a-time basis or one immediately adjacent the other to be separately processed for both environmental reasons and economic reasons.

FIG. 11 shows a front view of the bed 747 of the refuse truck 743 of FIG. 10. The truck 743 is seen as having a set of tires 790 carried by an axle 821 and a bed side 790. The refuse container, can or barrel 33 of FIG. 11 is shown as including a can top or openable lid 811, a rib portion 813, a lower outer peripheral side portion 35 having a first diameter which is separated by the ridge 805 from a top outer peripheral surface portion 807 having a greater diameter. The top 809 is openable about the hinge pin 815 which is secured through the rib portion 813 contiguous with the top portion 807. The refuse container 33 of FIG. 11 is also shown as being provided with a pair of rear wheels 813 mounted on a wheel axle 819. In actuality, however, the particular shape and size of the refuse container 33 being handled by the loader assembly 749 of the present invention is only limited by the fact that the refuse containers 33 may have particular size and shape to which the gripping arms or members can be adapted, but is not important to an understanding of the present invention or to the uses to which it may be put. The loader assembly 747 is shown as having a guide rail assembly 751 including a relatively straight vertical position 451 and provided with a generally circular or arcuate track portion 825 adjacent its vertical upper end. A generally triangular plate 827 is associated with the generally circular track portion 825, as hereinafter described with reference to FIG. 13. The view of FIG. 11 is taken on or along the n$^{th}$ partition 829 and the portion circled in phantom lines, including the circled portion 830 and the circled portion 832 are hereinafter described in detail in FIGS. 13 and 14, respectively. When the refuse barrel 33 is in its up or dump position, it is indicated in phantom lines and similar parts are designated by similar reference numerals followed by the prime symbol ('). When in the dump position, the contents of the barrel 33' fall out of the container 33' as indicated by the dump direction arrow 125, and into the particular compartment or bin of the truck bed 747 into which that can or container 33' is to have its particular contents emptied.

FIG. 12A illustrates the longitudinally movable loading assembly 749 of the present invention and shows the gripping arm-operating assembly 835, the gripping arm assembly 753, the carriage assembly 755, the rail or track assembly 751, the straight vertical rail portion 751, the partially circular upper end rail portion 825, and the drive link chain 111 of the present invention. The carriage assembly 755 is shown as including a vertical front movable carriage support 737 having a pivot pin 839 at the upper end portion thereof and a vertical side member 837. The exterior track assembly 841 is shown as having an external rail or track guide 843, an interior rail or track guide 845, and a roller track channel 847 disposed therebetween. The exterior track assembly 841 has the track channel 847 is closed at the bottom end by a track closure member 849. At the upper end of the interior rail 845, a Y-shaped track divider 851 is provided with the base of the tracked divide 851 being the interior rail guide 845. The track divider 851 includes, or branches into a first arm portion 853 and a second arm portion 855. Disposed at the upper end of the second arm 855 in between the arm 855 and the exterior guide rail or track rail 843 is a channel opening 863 into the open track circular portion 825. Exiting the circular open track portion 865, the wheel guide channel 860 between the arm 855 and the interior rail or track guide 861 is a channel entrance 865. At the opposite end of the interior rail assembly 859 is an angled member 870 which guides the drive chain 111 through a gaged track opening 867 via a normally-closed gate 869 mounted on a hinge pin 871. The gate 869 is disposed between an open portion of the guide rail or track guide 845 at the lower end of the chain roller channel 860 formed between guide rails 845 and 861.

The chain drive assembly 111 is shown as having a first end portion 873 and an opposite end portion 875 which are not connected to one another in a loop configuration. The direction of motion of the chain assembly 111 is indicated by the directional arrow 877 for raising the refuse container 33 from its down (home) position to its up or dump position, as previously described.

FIG. 12B shows the carriage assembly 755 being lifted by the drive chain 111 to an intermediate position along the guide rail assembly 751. The motion of direction arrow 881 indicates that the carriage, and the selected refuse container or barrel 33 carried thereby is being raised from the down position of FIG. 12A to the dump position shown in FIG. 12C. In FIG. 12B, the gate 869 is shown as being opened into the hollow interior of the channel 847 so that the gate opening permits the passage of the chain end portion 875 therethrough from the channel 860 into the original channel 847 as the opposite end portion 873 of the drive chain 111 is used to raise the carriage assembly 755.

FIG. 12C shows the end portion 873 of the drive chain assembly 111 in the full up or dump position with the opposite end portion 875 being disposed at the lower closed end 849 of the channel 847 where the upper end 873 first started. The carriage assembly 755, is now positioned partially around the circular portion 825 as the contents of the refuse container 33 are being dumped into the chosen or selected compartment or bin, as previously described.

FIG. 13 shows that circled portion designated by reference number 830 in FIGS. 11 in greater detail. In FIG. 13, the longitudinal movement assembly 759 is shown as including a wheel 891 having a pair of generally cylindrical end portions 893 and a V-shaped slot or groove 895 disposed therebetween. The grove 895 includes a pair of inwardly angled sides 897 extending from the outer peripheral sides of the cylindrical portions 893 and terminating radially inwardly in a slot or grove apex 899. The wheel 891 includes a wheel axle pin 901 surrounded by a cylindrical wheel bearing 903. The ends of the axle are closed by conventional fasteners such as clip rings, hubs or the like, as indicated by reference numeral 905. The interior body of the wheel 891 which is comprised of hardened steel material, is indicated by the wheel body portion 907. The upper rail or track assembly 795 is shown as including a hollow L-shaped portion having a vertical side or surface 909 and a horizontal surface 911 formed as an add-on to or integral with the side 790 of the refuse truck 743. An attachment plate 913 includes an elongated vertical side member 915 having a lower V-shaped end portion 917 having a bight 919. An angle iron strip 921 has a first side 923 and a second side 925 separated by an interior vertex angle 937. A hollow triangular space 929 exists between the sides 923 and 925, respectively, and is disposed adjacent the surface 911 while the lower end of the side or leg 925 is disposed upon the horizontal surface 911 while the distal end of the opposite side or leg 923 resides within the bight 919 of the V-shaped end portion 917. There is clearance about the end portion of side 923 so as not to interfere with the movement of the attachment panel 913 longitudinally along the side 790 of the truck 743. An interior plate 931 is also provided. Vertical elongated side 915 of the attachment plate 913 and the interior plate 931 are coupled to one another via the wheel axle 901 and the end closures 905, as previously described. There is a space or gap 933 between the interior surface of the plate 913 and the left end of the wheel 893 and a similar gap 933 between the interior surface of the interior plate 931 and the opposite end of the cylindrical wheel portion 893.

FIG. 14 shows the right vertical guide rail 935 on the side 790 of the refuse truck 743. An H-shaped bracket 941 having a first vertical side 943, a second vertical side 945, and a horizontal cross member 947, has its outer surface 948 of the first side 943 fixedly secured to the outer surface 950 of the side 790 of the refuse truck 743 by attachment means, such as a weldment 949 or the like. The exterior surface 951 of the second vertical side or leg 945 of the H-shaped bracket 941 acts as the running surface or track upon which the wheel 953 rolls or rides. The wheel 953 is shown as having a cylindrical bearing sleeve 955 and a cross-section of the sleeve 955 is as indicated by reference numeral 957. A wheel bearing 959 is provided about the axle pin 961 through the central interior of the wheel 953. The axle pin 961 is attached through an aperture in a first plate 965 via end closure member 963 and through an aperture in the elongated leg 971 of an L-shaped bracket 967 via end connector 963. The outer end portion of the plate 965 opposite the pin aperture of the plate 965 is shown as being attached to the right vertical guide rail 935 as by weldment 969 or the like. Similarly, the outer end portion of the long leg 971 of the L-shaped bracket 967 is also attached to the vertical guide rail 935 as by a weldment 969 and is positioned horizontally to receive the end of the wheel pin 961 therethrough and to be closed by closure member 963. The long leg 967 of the L-shaped bracket 967 forms the side of the wheel guide channel and the short vertical leg 973 of the L-shaped bracket 967 is disposed upwardly and spaced a predetermined distance or gap 975 from the interior surface 980 of the leg member 945 of the bracket 941. This allows sufficient clearance such that as the wheel 953 rolls or rides along the surface 951 of the leg member 945, and there is no interference between the member 945 and the short leg 973 of the bracket 967. The short leg 973 also ensures that the wheel 953 and is associated apparatus can not be pulled away from or off of the side 790 of the refuse truck 743 since it is prevented by the lower end of the vertical side 945 of the H-shaped bracket 941. The direction of movement of the wheel 953 is into and out of the paper as it rolls along the surface 951 of the bracket 941.

FIG. 15 shows the mechanism for longitudinally moving the loader assembly 749 along the side 790 of the refuse truck 743. Vertical lift rails 1041, 1042, 1043, and 1045, form the track assembly or channel assembly 749, as previously described. A hydraulic motor 1049 turns a drive shaft 1051 which rotates a drive gear 1053. A first idler gear or rear idler gear 1055 is mounted on a pivot pin or axle 1057 while a second idler gear 1059 is mounted on an axle or pin 1061. A drive chain 1063 is placed about the bottom of the gear 1059 up over the top of the drive gear 1053 and back under the lower portion of the idler gear 1055. One end 1065 of the drive chain 1063 is fixedly mounted within a C-shaped bracket 1069 having a base 1075 and legs 1071 and 1073 forming a hollow portion therebetween into which the last link 1065 of the chain 1063 is fitted or fixed. The C-shaped member 1069 is fixedly mounted to the end of the truck adjacent the tail gate 779 of the bed 747 as by weldment or any suitable conventional attachment means. The opposite end 1067 of the chain 1063 is fixedly mounted within a similar C-shaped bracket 1077 having a base 1083 and outwardly extending legs 1079 and 1081 forming a hollow portion therebetween. At least a portion of the last link 1077 is fixedly mounted within this hollow area between the arms 1079 and 1081 by any conventional means, such as anchor pins or the like and the base 1083 of the bracket 1067 is fixedly secured to a front end portion of the side 790 of the track 743 as by weldment or any suitable attachment means. A movable plate 1093 has a generally rectangular front portion 1095 and a sloped rear portion 1091. The plate 1093 mounts a first wheel 1005 having an axle 1007 and a second wheel 1085 having a axle 1087. The wheels 1005 and 1085 ride on the track 1009 along the sides 790 of the bed 747. The C-shaped mounting bracket 1077 is secured to the front 981 of the bed 747 by any conventional fastening means such as welding or the like.

The direction of operation of the hydraulic motor pin 1049 controls the direction of rotation of the shaft 1051 and hence the direction of rotation of the gear 1053 thus driving the loader assembly 751 along the chain 1063 in either the right or left longitudinal direction, as controlled by the operator.

FIG. 16 illustrates a top view of the refuse truck 743 of FIG. 10. In FIG. 16, the bed 747 of the truck 743 is shown as having a fixed front end or front panel 789, a tail gate panel 779, and a plurality of panels or partitions 787, 785, 783, and 781 forming a plurality of individual distinct compartments or bins 767, 769, 771, and 773, 775 respectively. The barrel-gripping arm assembly 753 is shown as being partially opened as evidenced by the gap or opening 1099.

FIG. 17 shows yet another view, partially in section, of the bed portion 747 of refuse truck 743 of FIG. 10. In FIG. 17, the front of the bed is indicated by reference numeral 981 and the hose and cable housing portion 793 is shown as housing a plurality of hydraulic lines, conduits or hoses and cables 983. Each of the partition panels, including the tail gate 779, is shown as including a pair of vertical panels 985 and 987 separated by a gap or open channel 989 therebetween, and the tail gate 779 is shown as being operatively mounted on a hinge pin 991 for normal dumping purposes. The rear end of the hoses and cables 983 is shown as extending a first hydraulic line or hose 993 which is connected to a second vertical hydraulic tube or hose 995 via connector coupling 994. A second coupling 997 joins the lower end of the vertical hydraulic line 995 to the flexible hose 999 whose opposite end is connected via a coupling 1001 to another portion of the hydraulic system hidden behind the frame 761. Similarly, the hydraulic lines or hoses 983 are shown as being grouped and connected by a swivel connector 1007 to the drive assembly 757.

FIG. 18 shows, in greater detail, the positioning of the hydraulic hoses and cables 893 within the channel housing 793 of FIG. 17. In FIG. 18, the right guide rail 1011 is shown as including a L-shaped bracket 1013 having an elongated horizontal leg 1015 and a short vertical leg 1017. The long leg 1015 is connected rigidly to the vertical lift rail 1011 via any conventional fastening means, such as weldment or the like, and the short vertical leg 1017 extends downwardly. A second L-shaped bracket 1023 has its vertical long leg 1025 extending upward and its shorter horizontal leg 1027 forming the bottom of the channel housing 793. Within the hollow interior 1029 formed or bounded by the vertical leg 1023, horizontal leg 1027, and the side 790 of the refuse truck 743, are a plurality of hydraulic hoses and/or cables 1031. The hoses 1031 are connected through a swivel coupling 1019 which encircles the hoses and/or cables 1031 and is mounted to a pivot pin 1021 operatively disposed through an aperture in the short leg 1035 of the first L-shaped bracket 1013. This means that the bundle of cables and hoses 1031 is movably positioned with respect to the right lift rail 1011 for movement therewith. The opposite ends of the tubes and cables 1031 are disposed within the hollow interior channel 1029 as are a plurality of other hoses and cables 1027 and 1033, respectively. These run longitudinally along the side truck 743 or longitudinally frontward and backward as the swivel connection 1019 carries the bundle of cables and hoses 1031 with the drive assembly 757 of the loader assembly 749 of the present invention.

FIG. 19 shows a cross-sectional view of the panel; divider or partition 787 taken along view lines 19-19 of FIG. 17. In FIG. 19, the pivot gate assembly or panel 787 is shown as having one side or surface 1101 and an opposite side 1102. A pivot pin 1103 is mounted within a bearing 1105 within a C-shaped bracket 1107. The outside or base 1109 of the bracket 1107 is generally vertical and includes a top horizontal leg 1113 and a bottom horizontal leg 1111. Within the hollow bight of the C-shaped bracket 1107, the hinge pin 1103 is mounted within the bearing assembly 1105. The positionable partition gate 787 is shown as having a top portion 115, a bottom portion 117 and a mid portion 119. The interior sides or ends 1121 and 1123 of the bed sides 1097 and 790, respectively, of the truck 743 are proximate the left end or side 1125 and the right end or side 1127 of the gate assembly 787 and are disposed substantially abutting a predetermined small separation, space or distance from the interior surfaces 1121 and 1123, respectively. A C-shaped latch bracket 1133 is mounted within an aperture 1135 of each of the sides 790 and 1097 in the lower mid-portion 1119 thereof. Apertures 1135 in the side or end panels 1129 and 1131 are provided as is a mounting ear member 1137. Each of the mounting ear members 1137 is pivotally connected to the long vertical leg 1143 of a generally L-shaped locking link 1130 via pivot pin 1139. The horizontal shorter leg 1145 serves as a lock pin when inserted within the hollow interior of the C-shaped latch bracket 1133.

A first link member 1149 has one end connected to an aperture 1147 at the juncture of the short and long legs 1145 and 1143, respectively, of the L-shaped bracket 1141 and the opposite end of the linkage rod 1149 connected to an aperture 1159 in one leg 1155 of an inverted, T-shaped linkage member 1151. The member 1151 has a first horizontal leg 1155, a second horizontal leg 1157, and a vertical upright center leg 1153 whose longitudinal axis is generally perpendicular that of the horizontal legs 1155 and 1157 and mounted at the mid point or junction therebetween. A pivot pin 1161 mounts the junction of the arms 1155, 1157 and 1153 for rotation thereabout. The opposite end of the arm 1155 is proved with an aperture 1159 for receiving the opposite end of the first link 1149 therein for attachment thereto. A similar aperture 1159 at the outer end of the opposite leg 1157 is connected to one end of a second link member or rod 1149 while the opposite end of the second link rod 1149 is connected to the aperture 1147 of the opposite L-shaped member 1141, as previously described.

The vertical leg of the T-shaped link is designated by reference numeral 1153, and an aperture at the upper end thereof provides for connection to the outer distal end portion of a piston rod 1167 thereto via pin 1163. The piston rod 1165 is disposed through an aperture in one end 1160 of a pneumatic air cylinder 1169 and mounted to a piston 1189 within the hollow chamber 1171. A spring member 1191 normally biases the piston 1189 toward the left or end 1162 of the hollow piston chamber 1171. An inlet outlet port 1173 is connected via coupling 1177 to the air line 1175 which feeds back via coupling 1177 and the flex hose 1179 to the input line 1183 via coupling mechanism 1181. The compressed air enters the system via the air line 1183, as indicated by the directional arrow 1184. As fluid air enters the hollow chamber 1171 or is removed therefrom, the piston 1189 will move to the right as indicated by the direction arrow 1185 or to the left, as desired. When the piston rod 1185 is moved to the right, the inverted T-shaped link 1151 assumes the position shown in phantom lines and designated by similar reference numerals followed by the prime symbol ('). In this case, the arm 1155' has risen as indicated by the direction of motion or directional arrow 1167 while the second or opposite leg 1157' has fallen, as indicated by the direction of motion arrow 1167. When in this position, as indicated by the position of the link 1151' in phantom lines, 1145' from the hollow interior of the C-shaped members 1133 thereby unlocking the gate 787 and allowing it to open at the bottom end portion 1117 as it rotates about the upper pivot pins 1103 to dump the contents thereof for emptying the compartment in front of the partition gate 787.

FIG. 20 shows the control panel 1193 of the present invention as including a bin selection control 1195, an arm-gripping or grip control 1197, a control 1199, scissors control 1201, a lift control 1203, a power control 1205, a stop control 1207, and a dump gate control 1209. By operating the various labeled push buttons of the various control units on the panel 1193, the operator can control the positioning of the movable loader assembly longitudinally along the side of the truck for selecting any one of bin 1, bin 2, bin 3, bin 4 or bin 5 by the buttons on the bin control panel 1193. The operator can open or close the can-gripping arms by operating the open or closed grips push buttons of the grip control panel 1197. The operator can further control the carriage operation by pressing the forward and reverse switches of the carriage control 1199 or the extension and retraction of the scissors assembly by pushing the in or out button of the scissors control unit 1201. The lift is controlled by pressing the up or down button of the lift control section 1203 of the panel 1193, while the on/of switches of the power control 1205 controls electrical power and the switch 1207 can be used to stop everything as in the case of an emergency. Dump gate control 1209 can be operated for the tail gate or any of the partitions by pressing the appropriately numbered button on the dump gate control portion of the panel 1209.

Briefly, as the refuse truck 543 approaches a first refuse pick-up location along its route where one or more refuse cans are to be picked up and emptied or dumped, the truck slows to a stop immediately adjacent the first selected can to be dumped. The cans may be color-coded, labeled, or provided with some form of indicia for human, mechanical, optical or electrical detection and decoding and identification to indicate the contents of that particular refuse container. The operator, using the control panel of FIG. 20, would first press the open button on the grip control panel 1197 to open the can-gripping arms to receive the selected refuse container therein. The out button would then be pressed on the scissors control 1201 to extend the scissors assembly and the carriage mounting the can-gripping arms until the open arms encircle the selected refuse container to be picked up. The close button of the grip control 1197 is then depressed causing the arms to tightly encircle or otherwise grip the container or bracket means attached thereto and hold it firmly within its grasp. The in button of the scissors assembly control 1201 is then pressed to return the carriage from its pick-up position and restore the carriage unit to its home (and down) position along the side of the truck. The desired bin into which the particular contents of the selected refuse container is to be dumped is then selected by the control panel 1195 and the carriage moves longitudinally along the side of the truck until it is positioned immediately adjacent the selected bin via the forward/reverse switches of the carriage control 1199. Once stopped adjacent the selected bin, the up button is depressed on the lift panel or control 1203 causing it to rise under control of the hydraulic motor with its speed at least partially controlled by the operation of the cam plate and the cam follower assembly previously described, until the contents of the container are dumped into the particular chosen compartment. At this point, the down button is pressed on the lift control 1203 and the carriage assembly is restored to its down position. The forward or reverse button of the carriage control 1199 are then selected to move the carriage longitudinally along the side of the truck until its adjacent the position in which the operator desires to place the empty container. Once at that location, the scissors assembly is extended by depressing the out button on the scissors control 1201 until the container reaches its desired position. The open button is then pressed on the grip control 1197 to release the can and the scissors unit then retracts to its home position after the in button is depressed on control 1201. Meanwhile, or after it has arrived back at the down position, the closed button is pressed to close the gripping arms if the truck is to move on to another pick-up location or the arms can remain open if another can is to be picked up at that location. The carriage is then repositioned forward or backward along the side of the truck by the forward or reverse switch on the carriage control 1199 until the next selected can is located abeam or adjacent to the gripping arm assembly. The procedure is then repeated and the second third, fourth, etc. selected can picked up, dumped and returned and so on until all of the indicia-encoded cans have had their contents dumped in the correct bin of the bed of the refuse truck of the present invention. Once the truck is full or completes its route, it returns to a chosen location and the contents of each of the bins can be dumped, in order, from rear to front by on a one-at-a-time sequential operation of the dump gate control buttons on the panel portion 1209. If desired, all gates could be opened at once to dump a continuous series of piles of separable refuse on the ground or any other dumping combination of one or more bins.

In order to greatly improve the efficiency of the present system, mechanization and a commitment to an automatic control system were used. The task of discriminatively loading specific types or mixes of types of predetermined refuse in a corresponding selected bin of a multiple bin waste disposal truck was mechanized for substantially automatic operation. Various predetermined types of refuse such as paper, glass, plastics, metals, aluminum cans, trash and the like can be collected in separate bins, separately dumped at a waste disposal site and reprocessed or recycled and returned to society as useable products. this not only helps eliminate the environmental problems associated with prior art waste dumping techniques, but also makes a very substantial profit on recycled materials, perhaps offsetting or even more than paying for the costs now associated with refuse collection.

The refuse materials to be handled and collected are first accumulated in a plurality of refuse containers of the residential type in use today or as hereinafter designed for such purposes. The refuse truck provided with the automated loader assembly of the present invention drives along a predetermined pick-up or collection route and approaches a pick-up site. The truck pulls up along side of the refuse containers to be emptied, extends the opened gripping arms; receives the selected container therein; and initiates the automated collection cycle. The gripping arms automatically close about or otherwise grip or hold the container and retracts the gripping container to the home position adjacent the side of the truck. Under automatic control and simultaneously, the gripped can starts in vertically upward ascent up the rail assembly; the indica, color-code, imprint or the like is read to determined which bin is to receive the contents of the gripped can; and the rail assembly moves longitudinally along the side of the truck until it stops adjacent the proper bin. Still continuing automatically, the gripped can reaches the dump position and empties its contents into the bin adapted to receive those contents and begins it vertically downward descent as the rail assembly is longitudinally repositioned along the side of the truck to its original position. Once there, it continues automatically, extending and releasing the emptied container in its original spot, and retracts to the home or storage position. The operator receives a signal, audible and/or visual, to inform him that the cycle is complete so he can reposition the gripping assembly for the next container at that site or move the truck backward and/or forward for the neXt pick-up at the present site. The cycle is repeated until all refuse containers at a given route stop have been emptied. Then the driver proceeds to the next scheduled pick-up site and repeats the procedures previously described hereinabove.

There are many important features incorporated into the various embodiments of the present invention as set forth hereinbelow. (1) The present design is extremely compact and nested enough to be easily mounted on the side of a truck vehicle so that it can longitudinally transverse the side of the truck both forwardly and rearwardly past the truck wheels of a standard width truck and remain attached thereto within the existing legal requirements. (2) The use of an unattached chain segment to push or pull the refuse container-engaging mechanism from the ground to the upper vertical dump position where it dumps or empties its contents into an elevated hopper. The chain is contained within a rectangular box-like channel-forming track or channel which is slotted along one side for access to the moving links of the drive chain for enabling the carriage assembly to be selectively coupled to and uncoupled from the drive chain through the continuous elongated slit. The drive chain segments are moved up and down by cog engagement to a wheel fixedly attached to a reduction gear and driven by a hydraulic motor. (3) Drive wheels and a reduction gear can be operably disposed on located at either extreme of travel, i.e. at either the top or the bottom of the guide rails. (4) The guide rails can be permanently attached to the side of the truck or can be mounted to longitudinal back and forth movement on slides, rollers, wheels or the like. (5) The use of the scissors assembly or plates of the present invention to extend and retract the container-engagement means to a distance of several feet from the side of the truck and wherein the scissors plates can nest tightly in a relatively small compact area against the rail assembly for movement up and down the tracks from home position to dump position and back is extremely helpful. (6) The use of a cam for continuously and automatically regulating the hydraulic fluid to the hydraulic drive motor allows very precise control over the speed, acceleration and deceleration thereof thus controlling the movement of the container-engaging means for smooth travel, minimal cycle time, and optimal can dumping efficiency. the notch in the cam causes a very rapid acceleration-deceleration at the correct dumping position so as to cause a snap action-type optimally efficient emptying of the contents of the containers into the bin, hopper, or loading station.

It will be obvious to those of ordinary skill in the art that various changes, variations, modifications, alterations, and the like can be made in the apparatus of the present invention, the hydraulic circuitry or system, the electrical system, and the like without departing from the spirit and scope of the present invention which is limited only by the appended claims.

I claim:

1. An improved loader apparatus for a refuse truck including a bed having an open top loading station and a refuse storage area, said open top loading station including means operatively disposed at the one end thereof for moving the refuse emptied into said open top loading station into said refuse storage area and compacting same therein, said loader apparatus being utilized for lifting a refuse container and emptying the contents thereof into said open top loading station for refuse collection purposes, said improved loader apparatus comprising:

a rail guide assembly fixedly secured substantially at one exterior side of the bed and the frame of said refuse truck adjacent said open top loading station, said rail guide assembly including means for forming a set of roller wheel tracks and means for forming a drive chain track, said rail guide assembly further including an elongated, substantially vertical lower end portion and an arcuately turned upper end portion having its distal end terminating downwardly in the direction of the open top of said open top loading station;

carriage means including a set of roller wheel means for moving along said set of roller wheel tracks of said rail guide assembly, said carriage means including an interior carriage support means including said roller wheel means for up and down movement along said set of roller wheel tracks of said rail guide assembly, an exterior carriage support means, and extension/retraction means operatively connected between said interior and exterior carriage support means for extending and retracting said exterior carriage support means horizontally with respect to said interior carriage support means and for connecting said exterior carriage support means to said interior carriage support means for generally vertical up and down movement therewith along said set of roller wheel tracks, said extension/retraction means having a closed fully-retracted home position and a fully-extended pick-up position in which said interior carriage support means and said extension/retraction means are laterally spaced from said interior carriage support means;

gripping means operatively carried by said exterior carriage support means and having an opened position for operatively receiving a refuse container therein and a closed position for grippably retaining said refuse container for refuse collection purposes;

A single finite length of drive chain having first and second opposite end portions which are unconnected from one another, said drive chain being operatively housed at least partially within said drive chain track for up and down movement therealong;

means for driving said drive chain along said drive chain track and including means for operatively controlling the speed, acceleration and deacceleration thereof;

means operatively coupled to said interior carriage support means for removably coupling and uncoupling said carriage means to said drive chain for vertical up and down movement therewith;

cam means having a cam shaft operatively driven by said driving means and having an outer peripheral cam surface thereon;

cam follower means responsive to the contour of said outer peripheral cam surface of said cam means for at least partially controlling the speed, acceleration and deacceleration of said chain drive means; and means operatively coupled to said extension/retraction means, said gripping means, said chain drive means, said carriage coupling means, and said valve means for selectively controlling the operation thereof.

2. The improved loader apparatus of Claim I wherein said means for driving said drive chain along said drive chain track includes:

a hydraulic motor;

means for controlling the operation and speed of said hydraulic motor;

a motor drive shaft having one end portion operatively coupled to and rotated by said hydraulic motor;

a chain drive sprocket gear operatively mounted on the opposite end portion of said drive shaft for rotation therewith, said chain drive sprocket gear having sprocket-engaging means on the outer peripheral edge thereof for driving said chain.

3. The improved loader apparatus of claim 2 wherein said driving means further includes timing gear means operably coupled to said motor drive shaft for rotation therewith, and means operably coupling said timing gear means to said cam shaft for rotating same.

4. The improved loader apparatus of claim 1 wherein said extension/retraction means includes a scissors assembly.

5. The improved loader apparatus of claim 4 wherein said cam shaft includes a driven gear operatively mounted thereon for rotating same and said cam shaft rotating means includes a first endless loop means operatively mounted over said timing gear means and said driven gear for rotating said cam shaft in proportional synchronism with the rotation of said motor drive shaft.

6. The improved loader apparatus of claim 1 wherein said cam follower means includes:

support means fixedly secured to said refuse truck for supporting said cam follower means;

an elongated arm assembly having one end portion, an opposite end portion, and an intermediate portion therebetween;

pivot pin means for mounting said opposite end portion of said elongated arm assembly to said support means for pivotal movement with respect thereto;

follower means operatively mounted to said one end portion of said elongated arm assembly for maintaining continual contact with said cam surface and moving said elongated arm assembly back and forth about said pivot pin means as said follower means tracks the contour of said outer peripheral cam surface;

biasing means having one end portion operatively anchored to the intermediate portion of said elongated arm assembly and an opposite end portion operatively anchored at a fixed location for continuously urging said follower means against the outer peripheral surface contour of said cam means;

a contact means operatively secured to said opposite end portion of said elongated arm assembly adjacent said pivot means for backward and forward movement with said elongated arm assembly;

control valve means for at least partially controlling the speed, acceleration and deacceleration of said hydraulic motor, said valve means including an external control button for operating same; and said control valve means further including internal means for continuously urging said control button against said contact means for reciprocal movement into and out of the interior of said valve means for controlling the operation thereof and therefore the speed, acceleration and deacceleration of said hydraulic motor.

7. The improved loader apparatus of claim 6 wherein said contact means includes a plate member, said pivot means includes a pivot pin, and said biasing means includes a conventional tension spring.

8. The improved loader apparatus of claim 6 wherein said follower means includes a roller wheel operatively mounted by a wheel axle to one end of said elongated arm assembly, said roller wheel being rotatable about said wheel axle such that its outer peripheral surface continuously contacts said outer peripheral surface contour of said cam means for movement thereover as said cam means rotates about said cam shaft such that said elongated arm assembly moves back and forth with the passage of said roller wheel over the outer peripheral surface contour as said elongated arm assembly pivots about said pivot means and said contact means mounted to said opposite end thereof controllably reciprocates back and forth to move said control button of said control valve means into and out of said valve means for control purposes.

9. The improved loader apparatus of claim 6 wherein said elongated arm assembly includes a pair of elongated, spaced apart members each having a plane generally parallel to one another.

10. The improved loader apparatus of claim 1 wherein said cam means includes:

a cam plate having a central aperture means for mounting said cam plate to said cam shaft for rotation therewith; and said cam plate further having an outer peripheral surface, said surface having a predetermined contour for at least partially determining and controlling the speed, acceleration, and deacceleration of said hydraulic motor via said cam follower means and said value means.

11. The improved loader assembly of claim 10 wherein said outer peripheral surface contour of said cam plate includes:

a first start position;

a first acceleration portion immediately following said start portio for rapidly accelerating said drive means to a predetermined full speed as rapidly as desired;

a first full speed portion immediately following said first acceleration portion for rapidly moving said carriage means upwardly along said wheel guide channels and over at least a portion of said downwardly curved upper end portion of said rail means;

a deceleration portion immediately following said first full speed portion for slowing to a second predetermined reduced speed as said carriage means approaches the end of said upper end portion of said rail means;

a second reduced speed portion immediately following said deceleration portion;

a relatively rapid second acceleration portion immediately following said second reduced portion;

a rapid snap-action type second deceleration portion to a full stop immediately following said second acceleration portion for maximizing the efficiency of emptying the content of the gripped refuse container into said front loading station; and a dead space between the end of said rapid snap-action type second deceleration portion and said start portion serves no control function.

12. The improved loader assembly of claim 1 wherein said refuse container includes a generally cylindrical portion adapted to be retainably and releasably grasped by said gripping means and wherein said gripping means comprises:

an arcuately curved base support member attached to the outer surface of said exterior carriage support means for movement therewith, said base support means having a first end portion, and opposite end portion, and a arcuately curved intermediate base portion therebetween, said arcuately curved intermediate base portion having an outwardly-facing concave surface dimensionally curved to abut one portion of said generally cylindrical portion of said refuse container during gripping operations;

a first, elongated, generally arc-shaped gripping arm having a first end portion operatively mounted to said exterior carriage support means adjacent said first end portion of said base support member, a second opposite distal end portion, and an intermediate, arcuately curved gripping portion therebetween, said intermediate arcuately curved gripping portion having a concave interior container-gripping surface dimensioned to fit snugly about a second portion of said generally cylindrical portion of said refuse container for gripably engaging same;

a second, elongated, generally arc-shaped gripping arm having a first end portion operatively mounted to said exterior carriage support means adjacent said opposite end portion of said base support member, a second opposite distal end portion, and an intermediate arcuately curved gripping portion having a concave interior container-gripping surface dimensioned to fit snugly about a third portion of said generally cylindrical portion of said refuse container for gripably engaging same;

hydraulic valve means operatively mounted to said exterior carriage support means for opening and closing said first and second gripping arms with respect to each other for releasing and retainably gripping said generally cylindrical portion of said refuse container therebetween, said container also abutting said concave surface of said base support means, respectively; and means for selectively controlling said hydraulic valve means for retainably gripping and releasing said refuse container for refuse collection purposes.

13. An improved refuse collection system including a refuse truck having a truck cab for housing at least an operator, a truck frame, and a bed carried by said frame, said bed including an elongated bottom, a pair of longitudinal sides, a front end, and a rear tailgate defining a substantially hollow bed interior divided into an open top loading station and a refuse storage portion, said system including a refuse container-loading apparatus comprising:

rail means operatively fixedly mounted to at least one of said truck frame and one side of said bed adjacent said open top loading station at substantially one side of said truck, said rail means including means for forming a first set of wheel channels and a drive chain channel, said rail means including a relatively vertical lower end portion and a partially semicircular arcuately downwardly turned upper end portion extending over said one side of said bed and facing on said open top loading station;

carriage means including wheel means operatively disposed within said set of wheel channels for up and down movement therein and having a down home position and an up dump position;

means operatively carried by said carriage means for retainably engaging and releasing a selected refuse container;

means operatively coupling said carriage means and said engaging and releasing means for extending said engaging and releasing means to a pick-up position a predetermined distance from said one side of said bed and spaced from said rail means for retainably engaging a refuse container to be emptied and releasing an emptied refuse container and retracting said engaging and releasing means to a home position adjacent said one side of said bed for enabling said carriage means to lift and lower same along said rail means for dumping purposes;

a single finite length of sprocket drive chain having first and second end portions which are unconnected from one another housed within said drive chain channel for up and down movement along said rail means;

means for operatively coupling and uncoupling said drive chain to said carriage means;

hydraulic motor means for driving said drive chain up and down said rail means; and speed control responsive to the actual speed, acceleration and deceleration of said carriage means for automatically controllably adjusting the speed, acceleration and deceleration of said hydraulic motor means for minimizing the time required to lift a refuse can to be emptied, dump the contents thereof into said open top loading station and lower said emptied refuse container to said home position while simultaneously optimizing to dumping efficiency of system.

* * * * *